(12) United States Patent
Shepherd et al.

(10) Patent No.: US 9,032,290 B2
(45) Date of Patent: May 12, 2015

(54) TOOL FOR CREATING STRUCTURED OBJECTS AND ACTIONS ON A SOCIAL NETWORKING SYSTEM

(75) Inventors: Brynn Shepherd, San Francisco, CA (US); Carl Philip Sjogreen, San Francisco, CA (US); Vladimir Fedorov, Menlo Park, CA (US); Naitik Shah, Mountain View, CA (US); Edward Kenneth O'Neil, Seattle, WA (US); Lars Eilstrup Rasmussen, San Francisco, CA (US); Paul Tarjan, Palo Alto, CA (US); Michael Steven Vernal, San Francisco, CA (US); Arthur George Rudolph, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 405 days.

(21) Appl. No.: 13/239,345

(22) Filed: Sep. 21, 2011

(65) Prior Publication Data

US 2013/0073979 A1    Mar. 21, 2013

(51) Int. Cl.
*G06F 17/00* (2006.01)
*G06Q 10/10* (2012.01)
*G06F 17/30* (2006.01)
*G06F 17/27* (2006.01)
*G06Q 50/00* (2012.01)

(52) U.S. Cl.
CPC .......... *G06Q 10/10* (2013.01); *G06F 17/30722* (2013.01); *G06F 17/277* (2013.01); *G06Q 50/01* (2013.01)

(58) Field of Classification Search
CPC .................. G06F 17/277; G06F 17/30722
USPC ......... 715/200, 243, 244, 247, 255, 262, 272, 715/273
See application file for complete search history.

(56) References Cited

U.S. PATENT DOCUMENTS

| | | | |
|---|---|---|---|
| 2011/0276396 A1* | 11/2011 | Rathod | 705/14.49 |
| 2011/0295661 A1* | 12/2011 | Dodge et al. | 705/14.4 |
| 2011/0314017 A1* | 12/2011 | Yariv et al. | 707/737 |
| 2012/0214568 A1* | 8/2012 | Herrmann | 463/16 |
| 2012/0303703 A1* | 11/2012 | Richter et al. | 709/204 |
| 2012/0303722 A1* | 11/2012 | Richter et al. | 709/206 |
| 2012/0317109 A1* | 12/2012 | Richter et al. | 707/734 |
| 2012/0331067 A1* | 12/2012 | Richter et al. | 709/206 |
| 2013/0013700 A1* | 1/2013 | Sittig et al. | 709/206 |
| 2013/0041653 A1* | 2/2013 | Tseng | 704/9 |
| 2013/0073280 A1* | 3/2013 | O'Neil et al. | 704/9 |
| 2013/0073568 A1* | 3/2013 | Federov et al. | 707/749 |
| 2013/0073632 A1* | 3/2013 | Fedorov et al. | 709/205 |
| 2013/0073983 A1* | 3/2013 | Rasmussen et al. | 715/753 |

\* cited by examiner

*Primary Examiner* — Stephen Hong
*Assistant Examiner* — Gregory J Vaughn
(74) *Attorney, Agent, or Firm* — Fenwick & West LLP

(57) ABSTRACT

A social networking system includes a mechanism for integrating user actions on objects outside of the social networking system in the social graph. External system operators include widgets that, when executed by user devices, record user interactions that correspond to a defined structure of actions and objects. Third party operators utilize a tool provided by the social networking system to define the structure of actions and objects. External actions are recorded by the social networking system for publishing to the social graph.

21 Claims, 18 Drawing Sheets

Action Type: play
Open Graph Tool > Action Type: play

Edit verb forms and other properties of your Open Graph action type "play." Learn more.

Action type name:
play — 338

Verb forms:
Nair [played]
  *past tense*
Nair and 2 other friends [played]
  *past tense*
☐ Add support for present tense verbs Types of objects a user can play:
[tennis match] — 340

[Save Changes]  [Cancel]

Graph API endpoint:
graph.facebook.com/me/sports_matchbook.play

Examples of play actions on Facebook:

Nair Flores played {tennis match title} on The MatchBook. — 342
  {tennis match title}
  {tennis match description}
  Type: {sample value}
  a few seconds ago Nair Flores and 2 other friends played {tennis match title} on The MatchBook. — 344
  a few seconds ago

TOOL FOR CREATING STRUCTURED OBJECTS AND ACTIONS ON A SOCIAL NETWORKING SYSTEM

BACKGROUND

This invention relates generally to social networking, and in particular to a tool for defining structured objects and actions on a social networking system.

Social networking systems have become prevalent in recent years because they provide a useful environment in which users can connect to and communicate with other users. Although a variety of different types of social networking systems exist, these systems commonly provide mechanisms allowing users to define and interact within their social networks. In this context, a user may be an individual or any other entity, such as a business or other non-person entity. Accordingly, while enabling social communications among friends, a social networking system can also be a valuable tool for businesses to engage with potential consumers. Even without a commercial purpose, a social networking system may allow other types of entities to spread their message. For example, a non-person entity may set up a page or group that other users can "like" or otherwise become associated with, which enables the non-person entity to provide a forum to receive and transmit communications to a group of interested users.

Useful social information may be maintained conceptually in a "social graph" of nodes interconnected by edges. Each node in the social graph represents something that can act on and/or be acted upon by another node. Common examples of nodes include users, non-person entities, content items, groups, events, locations, messages, concepts, and any other things that can be represented by an object in a social networking system. An edge between two nodes in the social graph represents a particular kind of connection between the two nodes resulting from an action that was performed by one of the nodes on the other node.

For example, if one user establishes a connection with another user in the social networking system, the users are represented as nodes, and the edge between them represents the established connection. Continuing this example, one user may send a message to the other within the social networking system. The messaging action represents another edge between the two nodes that is identified by the social networking system. The message itself may be treated as a node. In another example, one user may tag another user in an image maintained by the social networking system. This tagging action may create edges between the users as well as an edge between each of the users and the image, also a node. In yet another example, if a user confirms attendance at an event, the user and the event are nodes, where the attendance of the event is the edge. Using a social graph, therefore, a social networking system may maintain many different types of objects and the interactions and connections among those objects, thereby generating an extremely rich store of socially relevant information.

Real-world social interactions, such as driving across the country, visiting landmarks, all while listening to a soundtrack discovered with other friends on the road trip, have not been adequately captured by social networking systems. This problem can be appreciated in the context of the discussion of the social graph. If something is not represented by a node in the first place, then other nodes cannot interact with it such that the social networking system can discover an edge between those nodes. For example, a person may listen to dance music on an internet radio station while jogging in the park with her friend. Multiple external systems and websites may be used to capture this information, including song title, artist, genre, location, miles traveled, and duration of the run. If it were desirable to discover the artists and genres of music that a user listens to on external systems, that information would have to be provided to the social networking system by the external systems. Currently, users on external systems would manually share this information to the social networking system. This creates a bottleneck in sharing the music played using the external system. Further, if an external system does not enable this feature, users cannot share music with others on the social networking system. Opening up a social networking system to the unlimited amount of information that may be gathered from external real-world interactions, such as listening to music, could also inundate users of the social networking system with too many content items. Efficient mechanisms have not been generated to present this information to users of the social networking system.

Accordingly, what are needed are mechanisms to define a customized structure of the social graph, including actions and objects, to enable a social networking system to discover, share, and integrate information about these real-world social interactions into the social networking user experience.

SUMMARY

To enable a social networking system to discover socially relevant information about objects and their interactions, embodiments of the invention provide a flexible mechanism for integrating user actions on objects outside of the social networking system into the user experience on the social networking system. For example, music services that enable users to play streaming music on external systems may be integrated into the user experience on the social networking system. Third-party developers, in addition to administrators of the social networking system, may define objects and actions that enable integration of external music sources to be played and controlled using the social networking system while also providing socially relevant information to other users of the social networking system. In particular, embodiments of the invention enable graph action types and graph object types to be defined by third-party developers of external systems such as websites, applications, and enterprise systems accessible by a URL, URI, or any other address on the Internet or other network outside of the domain of the social networking system. Graph actions and graph objects, recorded from user interactions and reported to the social networking system, are structured based on the defined graph action types and graph object types to enable aggregation and structured querying. These associations of the graph actions and graph objects provide data visualizations of the information discoverable on the social graph. The graph actions and graph objects may also be translated into a textual description of how the graph actions were performed on the graph objects based on the definitions of the graph action types and graph object types. The external systems, or entities external to the social networking system, may be scored with respect to their reputation. These reputation scores may affect a ranking of content items generated from the graph actions and graph objects, in addition to preferences and affinities of viewing users. In this way, interesting information about users' actions, both inside and outside of the domain of the social networking system, may be shared and compared with other users on the social networking system.

Graph action types and associated graph object types may be defined by entities external to the social networking system. In one embodiment, a user interface may enable these entities, including third-party developers of external systems, to create graph action types and associated graph object types such that user interactions on the external systems may be captured as graph actions and graph objects in a social graph on the social networking system. Multiple external systems, in addition to the social networking system, may utilize the defined graph action types and associated graph object types in generating content items for display to users of the social networking system. Based on verb tenses and noun forms included in the definitions of the graph action types and associated graph object types, textual descriptions of the graph actions performed on the graph objects may be generated for the content items automatically and displayed to other users of the social networking system. Content items that include graph actions and graph objects generated by users of the social networking system may be ranked to incorporate the preferences of a viewing user, reputation scores of the entities that defined the graph action types and graph object types, as well as users' affinity scores for the entities. The ranking of content items ensures that users of the social networking system view relevant and reputable content items that include graph actions and graph objects that were defined by external entities. In one embodiment, the social networking system may integrate graph actions and graph objects regarding multimedia applications, such as streaming music and video, into the user experience by aggregating the graph actions and the graph objects performed by a user for display to other users in the social networking system.

Interactions performed on a web page on an external system, for example, by a user of the social networking system, such as listening to a playlist of songs, purchasing a gift, reading a book, adding a news article to a reading list, and running a marathon, can be recorded by a widget embedded in the web page. An action log may be generated by the widget that records the interactions based on the definitions of the graph action types and graph object types. These edges, or interactions between objects and users, can be published to the social graph and displayed as content items in a newsfeed or stream in the social networking system. The widget creating the action log may communicate the action log to the social networking system in a batch process or in real-time. In another embodiment, a social networking system may "scrape" an external system to retrieve the recorded actions in the action log. Content items indicate that a user has performed a structured action on an object within the web page are generated from the received graph actions and associated graph objects based on the definitions of the corresponding graph action types and graph object types.

As a result of publishing structured actions and objects into the social networking system, such as listening to a song, purchasing a book, reading a news article, adding a product to a wishlist, and jogging a running course, stories or descriptions about these structured actions may be automatically generated on the social networking system based on verb tenses and noun forms defined in the corresponding graph action types and graph object types. Once a user interaction on the external system is received by the social networking system, the social networking system may update the user's profile to add an association with the acted-upon object, post the action to the user's connections, and/or any combination of responses that are appropriate when a user interacts with an object in the social networking system.

In one embodiment, objects are defined as nodes in a social graph to integrate user interactions, captured as actions and embodied as edges in the social graph, on an external system, such as a website, into the social networking system. An object may be described by a web page on such a website that is encoded by a markup language document, which a web browser application can use to render and display the web page on a user device. The markup language document includes one or more tags, which include information to identify objects on the web page. The tags may provide textual titles, labels, identifiers unique to the objects, a micro format, and/or descriptions about the objects, as well as other information, such as the type of the objects, in one embodiment. In another embodiment, an object may be described in other formats, such as a database or flat file, where the tags describing the object are included in the database. In one embodiment, a widget, embedded in various web pages on a website by a third-party developer, may be executed by a browser application on the user device. In another embodiment, the widget may be embedded into an application running on the user device that makes application programming interface (API) calls with the external system and the social networking system. The widget includes instructions, or programming logic, to record user interactions with the web page for integration into the social graph. In this way, user interactions with a web page external to a social networking system may generate objects and actions on a social graph for integration with the social networking system. This effectively opens the social graph to third-party developers and encourages further development and definition of a complex and rich social graph.

In another embodiment, a user device requests a web page from a website server, which may be outside of and separate from the social networking system. The server sends to the user device a markup language document that includes an instruction for a browser application running on the user device to incorporate within the web page information obtained from the social networking system and also capture within the web page structured actions on specified objects, such as clicking on links and buttons that are tagged in the markup language document. In one embodiment, the instruction creates a frame within the web page that contains content pulled directly from the social networking system (e.g., an iframe). The content of the frame, provided by the social networking system, includes information queried from the customized actions and objects published to the social graph. Such information may include, for example, a user's most frequently listened songs, top artists, top genres, and the like for listening to music, the most frequently read articles by other users connected to the user on the social networking system, or even the most commonly shared routes for jogging in Palo Alto, Calif. by all users of the social networking system. The frame may also contain social information that is relevant to the user and the node, such as an indication of one or more of the user's connections in the social networking system who have also performed the action, such as purchasing a magazine for an electronic reader, installing a gaming application, and building a toy bear on an e-commerce website. User-specified queries and template queries may be used to populate the content of the frame, in one embodiment.

Accordingly, embodiments of the invention enable the social networking system to integrate any concepts and actions that can be performed by users on an external system into the user experience on the social networking system, such as creating and sharing playlists of music from multiple external systems, recommending music to users based on the listening habits of their connections on the social networking system, and collaboratively listening to a radio station with connections on the social networking system, as well as automatically sharing with other users connected to the user articles that have been read on news websites, videos that have been watched on video streaming websites, and workouts that have been performed and recorded through external systems applications. Because different external systems may host music streaming websites, video streaming websites, news aggregation websites, and the like, a social networking system may enable interactions with the external systems to be integrated into the user experience on the social networking system using structured objects and actions defined by administrators of the social networking system to streamline the process. For example, a user may listen to a playlist of songs using a particular music service, such as RDIO, and this action may be shared with the user's connections on the social networking system. Another user may listen to the same playlist of songs using a different music service, such as Spotify, because the social networking system has automatically mapped the song objects by name, artist name, and duration of the song. In other words, the social networking system may use the tags of an object to enable integration of the interactions into the social networking system experience. Similarly, a video watched by a user on one service, such as Netflix, may be shared with another user on the social networking system that may view the video on another service, such as Hulu. Additionally, a news story that is read by a user on one newspaper website, such as the New York Times, may be read by another user on a different newspaper website, such as the Associated Press. This integration of external user interactions with the social networking system enables the social networking system to learn more about the preferences of its users, including music choices, video genres watched, news articles read, products purchased, games played, and so on. Visualizations of this information may be created to provide socially relevant information for various purposes (e.g., posting activity feeds, targeting advertising, etc.).

BRIEF DESCRIPTION OF THE DRAWINGS

FIGS. 3B-3J are screenshots of an application for defining a graph structure representing an external user action outside of the social networking system, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview of a Social Networking System Architecture

Figure 1A:
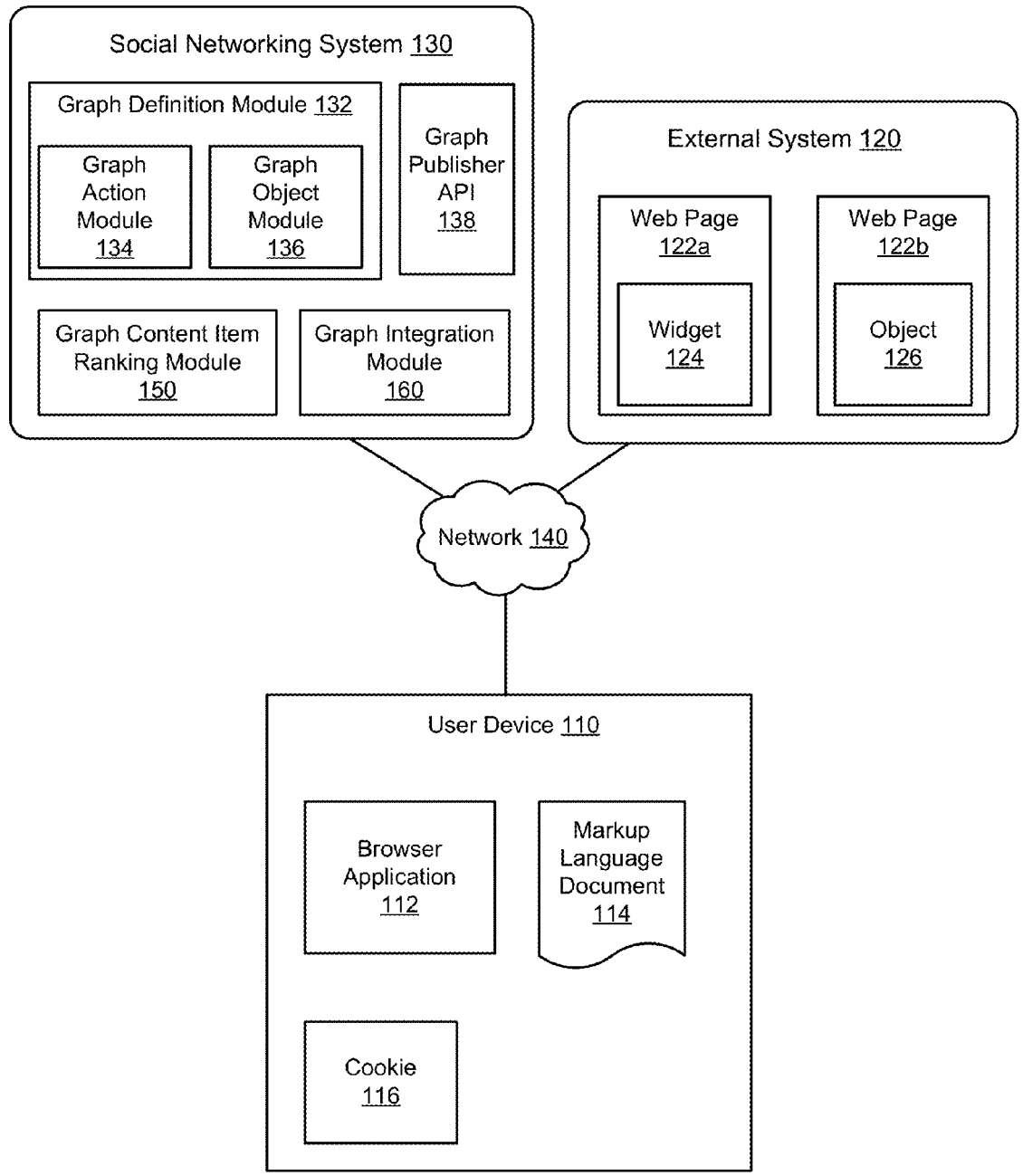
FIG. 1A is a network diagram of a system for structuring external user actions for publishing on a social networking system, in accordance with an embodiment of the invention.

FIG. 1A is a network diagram of one embodiment of a system 100 for structuring external user actions for publishing on a social networking system 130. The system 100 includes one or more user devices 110, one or more external systems 120, the social networking system 130 and a network 140. For purposes of illustration, the embodiment of the system 100 shown by FIG. 1 includes a single external system 120 and a single user device 110. However, in other embodiments, the system 100 may include more user devices 110 and/or more external systems 120. In certain embodiments, the social networking system 130 is operated by the social network provider, whereas the external systems 120 are separate from the social networking system 130 in that they may be operated by different entities. In various embodiments, however, the social networking system 130 and the external systems 120 operate in conjunction to provide social networking services to users of the social networking system 130. In this sense, the social networking system 130 provides a platform, or backbone, which other systems, such as external systems 120, may use to provide social networking services and functionalities to users across the Internet.

A user device 110 comprises one or more computing devices that can receive input from a user and can transmit and receive data via the network 140. In one embodiment, the user device 110 is a conventional computer system executing, for example, a Microsoft Windows-compatible operating system (OS), Apple OS X, and/or a Linux distribution. In another embodiment, the user device 110 can be a device having computer functionality, such as a personal digital assistant (PDA), mobile telephone, smart-phone, etc. The user device 110 is configured to communicate via network 140. The user device 110 can execute an application, for example, a browser application that allows a user of the user device 110 to interact with the social networking system 130. In another embodiment, the user device 110 interacts with the social networking system 130 through an application programming interface (API) that runs on the native operating system of the user device 110, such as iOS 4 and ANDROID. The user device 110 is configured to communicate with the external system 120 and the social networking system 130 via the network 140, which may comprise any combination of local area and/or wide area networks, using both wired and wireless communication systems.

In one embodiment, the network 140 uses standard communications technologies and/or protocols. Thus, the network 140 can include links using technologies such as Ethernet, 802.11, worldwide interoperability for microwave access (WiMAX), 3G, 4G, CDMA, digital subscriber line (DSL), etc. Similarly, the networking protocols used on the network 204 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the network 140 can be represented using technologies and/or formats including the hypertext markup language (HTML) and the extensible markup language (XML). In addition, all or some of links can be encrypted using conventional encryption technologies such as secure sockets layer (SSL), transport layer security (TLS), and Internet Protocol security (IPsec).

In one embodiment, the user device 110 displays content from the external system 120 or from the social networking system 130 by processing a markup language document 114 received from the external system 120 or from the social networking system 130 using a browser application 112. The markup language document 114 identifies content and one or more instructions describing formatting or presentation of the content. By executing the instructions included in the markup language document 114, the browser application 112 displays the identified content using the format or presentation described by the markup language document 114. For example, the markup language document 114 includes instructions for generating and displaying a web page having multiple frames that include text and/or image data retrieved from the external system 120 and/or the social networking system 130. In various embodiments, the markup language document 114 comprises a data file including extensible markup language (XML) data, extensible hypertext markup language (XHTML) data, or other markup language data. Additionally, a markup language document 114 may include JavaScript Object Notation (JSON) data, JSON with padding (JSONP), and JavaScript data to facilitate lightweight data-interchange between an external system 120 and a user device 110. A browser application 112 on the user device 110 would need a JavaScript compiler to decode such a markup language document.

In one embodiment, the user device 110 also includes a cookie 116 including data indicating whether a user of the user device 110 is logged into the social networking system 130. The cookie 116 indicates whether the user of the computing device 110 is involved in an active session where the user device 110 exchanges data with the social networking system 130, allowing modification of the data communicated from the social networking system 130 to the user device 110. Use of the cookie 116 in exchanging data between the user device 110, the social networking system 130 and/or the external system 120 is further described below in conjunction with FIG. 4.

FIG. 1 and the other figures use like reference numerals to identify like elements. A letter after a reference numeral, such as "122a," indicates that the text refers specifically to the element having that particular reference numeral. A reference numeral in the text without a following letter, such as "122," refers to any or all of the elements in the figures bearing that reference numeral (e.g. "122" in the text refers to reference numerals "122a" and/or "122b" in the figures). Only two web pages 122a and 122b are shown in FIG. 1 in order to simplify and clarify the description.

The external system 120 includes one or more web servers including one or more web pages 122, which are communicated to the user device 110 using the network 140. The external system 120 is separate from the social networking system 130. For example, the external system 120 is associated with a first domain while the social networking website is associated with a separate social networking domain. Web pages 122 included in the external system 120 comprise markup language documents identifying content and including instructions specifying formatting or presentation of the identified content. Included within a web page 122a is a widget 124 that provides instructions to identify graph actions that are being performed by users on the web page. For example, if a user clicks on a link to play a song on the external system 120, the widget 124 provides instructions to the browser application 112 that is rendering the web page 122a to identify the graph action and the graph object, the clicking of the link for playing the song, according to a structure of objects and actions defined on the social networking system 130 using a graph definition module 132. Similarly, other types of graph actions, such as playing a game, adding an item to a wishlist, and watching a video, that are performed on the external system 120 may be associated with a link that, upon clicking by the user device 110, causes the widget 124 to provide instructions to the browser application 112 to identify the graph action according to a structure of objects and actions defined on the social networking system 130 using the graph definition module 132. The widget 124 may identify graph actions by recording the graph actions performed on graph objects in an action log that is periodically retrieved by the social networking system, in one embodiment. In another embodiment, the widget 124 may identify graph actions by communicating the graph actions back to the social networking system in real-time. The external system 120 may also include an object 126 that is described by a web page 122b. A third-party developer may use tags to describe the object 126 in the web page 122b in a markup language document. For example, the object 126 may be a song having a title, artist name, and duration. Tags may be used to describe the object 126 to include the song name, an artist object, and duration. Similarly, the object 126 may be a product having a name, description, and product category. The web page 122a may include a widget 124 that references the object 126 described by the web page 122b in a link. For example, the user clicks on a link on the web page 122a that plays the song represented by the object 126. Similarly, the user may click on a link on the web page 122a that adds the product represented by the object 126 to a wishlist object.

The social networking system 130 comprises one or more computing devices storing a social network, or a social graph, comprising a plurality of users and providing users of the social network with the ability to communicate and interact with other users of the social network. The social networking system 130 is further described below in conjunction with FIG. 2. In use, users join the social networking system 130 and then add connections to a number of other users of the social networking system 130 to whom they desire to be connected. As used herein, the term "friend" refers to any other user of the social networking system 130 to whom a user has formed a connection, association, or relationship via the social networking system 130.

Connections may be added explicitly by a user or may be automatically created by the social networking systems 130 based on common characteristics of the users (e.g., users who are alumni of the same educational institution). For example, a first user specifically selects a particular other user to be a friend. Connections in the social networking system 130 are usually in both directions, but need not be, so the terms "user" and "friend" depend on the frame of reference. Connections between users of the social networking system 130 are usually bilateral, or "mutual," but connections may also be unilateral, or "one-way." For example, if Bob and Joe are both users of the social networking system 130 and connected to each other, Bob and Joe are each other's connections. If, on the other hand, Bob wishes to connect to Joe to view data communicated to the social networking system by Joe but Joe does not wish to form a mutual connection, a unilateral connection may be established. The connection between users may be a direct connection; however, some embodiments of a social networking system allow the connection to be indirect via one or more levels of connections or degrees or separation.

In addition to establishing and maintaining connections between users and allowing interactions between users, the social networking system 130 provides users with the ability to take actions on various types of items supported by the social networking system 130. These items may include groups or networks (where "networks" here refer not to physical communication networks, but rather social networks of people, entities, and concepts) to which users of the social networking system may belong, events or calendar entries in which a user might be interested, computer-based applications that a user may use via the social networking system 130, transactions that allow users to buy or sell items via the service, and interactions with advertisements that a user may perform on or off the social networking system. These are just a few examples of the items upon which a user may act on a social networking system, and many others are possible. A user may interact with anything that is capable of being represented in the social networking system 130 or in an external system 120, separate from the social networking system 130, coupled to the social networking system 130 via a network 140.

The social networking system 130 is also capable of linking a variety of entities. For example, the social networking system 130 enables users to interact with each other as well as external systems 120 or other entities through an API or other communication channels. Thus, the social networking system 130 generates and maintains a "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, events, messages, concepts, and any other things that can be represented by an object in the social networking system 130. An edge between two nodes in the social graph represents a particular kind of connection between the two nodes, which may result from an action that was performed by one of the nodes on the other node. For example, when a first user identifies a second user as a friend, an edge in the social graph is generated connecting a node representing the first user and a second node representing the second user. As various nodes interact with each other, the social networking system 130 modifies edges connecting the various nodes to reflect the interactions.

The social networking system 130 also includes user-generated content, which enhances a user's interactions with the social networking system 130. User-generated content may include anything a user can add, upload, send, or "post," to the social networking system 130. For example, a user communicates posts to the social networking system 130 from a user device 100. Posts may include data such as status updates or other textual data, location information, photos, videos, links, music or other similar data and/or media. Content may also be added to the social networking system 130 by a third-party through a "communication channel," such as a newsfeed or stream. Content "items" represent single pieces of content that are represented as objects in the social networking system 130. In this way, users of the social networking system 130 are encouraged to communicate with each other by posting text and content items of various types of media through various communication channels, increasing the interaction of users with each other and increasing the frequency with which users interact with the social networking system 130.

As users of the social networking system 130 utilize external systems 120, their actions on those external systems 120 may be captured and reported to the social networking system 130. Further, the actions taken on external systems 120 may be identified by the widget 124 such that the social networking system 130 may derive semantic meaning from the action. For example, clicking on a link that plays a song on an external system 120 not only indicates that the user listened to that song, but may also indicate that the user prefers to listen to dance music because the song is the $100^{th}$ song played in the dance music genre. Or, the user may enjoy listening to the artist who sings that song because the user has played over 1000 songs by that artist. Semantic meaning between concepts such as "listen," "play," "song," "artist," and "genre" is achieved by providing structure for the social networking system 130 to derive meaning. The social networking system 130 includes a graph definition module 132 that enables actions and objects to be defined in the social graph. A graph action module 134 defines graph actions that can be performed by users, such as listening to a song, purchasing a pair of shoes, or reviewing a movie. A graph object module 136 defines graph objects that can be acted upon by users, such as songs, radio stations, products, movies, and the like.

The graph definition module 132 enables third-party developers to define properties of graph actions and graph objects, including verb tenses and noun forms, related graph objects, and data visualization templates. Third-party developers may define a graph action, such as a "listen" action, to have past, present, singular and plural verb tenses. Similarly, a graph object, such as a "song" object, may be defined to have a singular and plural noun form, as well as object properties that include other objects, such as an "artist" object and a "genre" object. By defining verb tenses and noun forms, textual descriptions of users performing graph actions on graph object may be automatically generated by the social networking system for communicating stories to users of the social networking system. In one embodiment, stories that include graph actions and graph objects may be translated into different languages based on the definitions of verb tenses and noun forms. Action types may be defined by third-party developers using a user interface tool, in one embodiment, on the social networking system 130 associated with the graph definition module 132. Once an action type is defined by a third-party developer using the user interface tool, which involves configuring the action type to be performed on a certain object type, the social networking system 130 may expose a webpage for an external system 120 to access the action type. As another example, a "purchase" action type may be defined by a third-party developer that may be performed on a "product" object type and that may be associated with other object types, such as a "wishlist" object type. A third-party developer may generate web pages 122a on an external system 120 where one web page 122b includes an object 126 of the "product" object type and another web page 122a with a widget 124 that enables a user to purchase a product on the user's wishlist on the external system 120, where the widget 124 records a "purchase" action performed on a "product" object.

Analysis may be performed on the concepts, such as aggregating the frequency of plays of a specific song or songs by an artist using structured queries on objects and actions. These aggregations may be published as newsfeed stories in a stream on the social networking system 130, may be used by applications on external systems to compare users, or may be used in any number of ways. A graph publisher API 138 receives actions taken on external systems by users and publishes the external user actions to the social graph using the defined properties of the objects and actions, such as aggregation. In one embodiment, third-party developers utilize the graph definition module 132 to define the properties of graph objects and graph actions in the social graph. In another embodiment, administrators of the social networking system 130 define properties of graph objects and graph actions in the social graph. Because graph objects and graph actions may be globally defined in some embodiments, administrators may define initial properties of certain graph objects and graph actions for uniformity. In other embodiments, specific objects and actions may include different properties and the differences may be reconciled by a standards setting committee or by agreement. Some objects and actions may have undefined properties that can be later defined and/or reconciled by administrators of the social networking system or third-party developers.

The user device 110 may include a browser application 112 that interprets a markup language document 114 received from the external system 120. The markup language document 114 includes one or more tags including meta-information describing content within a web page 122a, including a widget 124. The tags may provide descriptions about objects, such as a title, type, label, unique identifier, micro format, and/or other descriptions about the objects in the social networking system 130. For example, the markup language document 114 may include a link to an application that enables users to build a virtual snowman and share the customized virtual snowman on the social networking system 130. An object 126 may be defined for a snowman object by a third-party developer that is described on a web page 122b on the external system 120. The snowman object may have object properties that include a corncob pipe, a button nose, and two eyes made out of coal, for example. Tags may be used on the web page 122b on the external system 120 to describe the object properties of the snowman object. These tags allow creation of structured objects in the social networking system 130 based on the structure defined in the web page 122b. In other embodiments, the tags that describe an object 126 may be stored in a database, file, or other type of format. A third-party developer may expand the definition of custom objects by adding more tags corresponding to more object properties. When the user device 110 executes the browser application 112 that interprets the markup language document 114 and receives user input, such as a click on a link, the browser application 112 may access the information in the web page 122b that describes the object 126 as referenced by the widget 124 in the web page 122a that includes the markup language document 114. As a result, the graph object that is created on the social networking system 130 has the object properties defined in the web page 122b that includes the tags that describe the object 126. This enables external systems 120 to define, create, and maintain objects in a social graph utilized by the social networking system 130.

In one embodiment, a web page 122a includes a widget 124 comprising instructions to, when executed by a browser application 112 of a user device 110, record and report actions taken by users within the web page 122a according to the social graph structure as defined by a graph definition module 132 and also retrieve and display socially relevant information from the social networking system 130 within the web page 122a. For example, a widget 124 may include an instruction to capture a selection of a link associated with skipping to the next song on an internet radio website. Semantically, the selection of the link to skip the song that is playing currently may indicate that the user is not interested in the song or dislikes it. This information may be tagged in a web page on the social networking system 130 that describes the action type such that the widget 124 can capture the event and pass that information to the social networking system 130. Thus, if a user skipped a song called "Row, row, row your boat," the tag associated with the selection of the "skip" link may indicate to the social networking system 130 that the user disliked that song, the artist singing the song, or the genre of the song, depending on how the action, "skip," is defined in the social networking system 130.

In one embodiment, the widget 124 reports an action taken on the external system 120 in real-time to the social networking system 130. The widget 124 may include an instruction to communicate the action to other users of the social networking system 130 through multiple communication channels, including email, SMS messaging, real-time chat messaging, notifications, newsfeed, stream, and API events that may be interpreted by an application operating on a mobile device. In another embodiment, the widget 124 creates an entry in an action log that can later be retrieved by the social networking system 130. The graph publisher API 138 assembles the received information and generates a newsfeed story or content item for a stream in the social networking system 130 based on templates provided by the social networking system 130 or customized visualizations created by third-party developers. The widget 124 also enables a web page 122a from the external system 120 to provide personalized content from the social networking website 130 when the web page 122a is rendered and displayed by a browser application 112 of a user device 110. The widget 124 includes an instruction for the browser application 112 to generate a frame within the web page 122a that includes socially relevant information from the social networking system 130, such as friends who have recently listened to the currently playing song. Using the tags describing the object 126 in the web page 122b, the widget may communicate with the social networking system 130 to identify other users connected to the viewing user that have interacted with the same object 126, the currently playing song on the web page 122a. After the widget 124 identifies the other users connected to the viewing user, information about the other users may be retrieved from the social networking system 130 and presented in the frame within the web page 122a on the external system 120. This information may include the names and profile photos of the other users that have also interacted with the same object 126.

The social networking system 130 also includes a graph content item ranking module 150 and a graph integration module 160. The graph content item ranking module 150 analyzes content items assembled from graph actions and graph objects resulting from user interactions on external systems and/or the social networking system. Based on the analysis, graph content items are ranked according to relevance and quality, providing a better user experience. The graph content item ranking module 150 may utilize several factors, both global and user-specific, in ranking graph content items for viewing users of the social networking system 130. The graph integration module 160 integrates structured actions and objects generated by users on external systems 120 as interactive elements on the social networking system 130. For example, a music control user interface may include two buttons that enable a user of the social networking system to play or pause music that is currently playing on an external system, such as an application running the user's local computer system, an application running on external systems such as a streaming music service, an internet radio station, or a "cloud-based" music service in which purchased music is stored on external systems instead of a local computer.

Different external systems 120 may provide music to users of the social networking system 130 via the music control user interface because of a uniform set of structured actions and objects were defined by administrators of the social networking system or third-party developers. The social networking system 130, in one embodiment, may de-duplicate objects, such as songs, that may be produced by multiple different external systems 120. For example, a first user may listen to a song on a music service, such as iTunes, and the listen action instance that is performed on the song object may be shared with other users of the social networking system 130. A second user may then listen to the same song on a different music subscription service, such as RDIO, because the social networking system 130 has recognized the object properties of the song object, including the title, artist name, and duration, and has created a virtual object for the song in the social networking system 130. As a result, when the second user views the first user's listen action instance performed on the song object for "Born This Way" by the artist, "Lady Gaga," the social networking system 130 has automatically mapped the song object created by the first user to a virtual object for the song object. The second user may then listen to the song using a different music subscription service, such as Spotify. In this way, the social networking system 130 may recognize similar objects and generate a virtual object that represents the similar objects across different domains, potentially defined using different tags on different external systems 120. This enables the social networking system 130 to aggregate instances of actions and objects and create interesting stories, such as the top news articles shared in a user's network of friends on the social networking system 130 across all news reporting websites, the top genres of music listened to by a user or by a defined group of users across all music subscription platforms and services, and the highest rated movies watched by users on the social networking system 130 on any video streaming service. This also enables the social networking system 130 to correctly build the social graph, such that an edge between a user and the movie "Transformers" is created, instead of an edge between a user and the movie "Transformers" as delivered by a particular video streaming service, such as Netflix. Through the music control interface, graph objects and graph actions are generated as the user listens to songs, including song objects, artist objects, genre objects, listen actions, skip actions, and the like. In one embodiment, artist objects and song objects may be stored and indexed on the social networking system 130 as well as other related objects, such as those described in FIG. 3A. Because song objects from different external systems 120 having different domains and different websites have been de-duplicated into a virtual song object for a unique song, the social networking system 130 may store and index user interactions with the song objects from different external systems 120 as interactions with a virtual song object for the unique song. More broadly, graph objects from different sites and domains that are similar, such as news articles, movies, and television shows, may be similarly de-duplicated by mapping the object properties of the graph objects, including the title, duration, word count, director, production year, and so on. The social networking system 130 may store and index a virtual object for the similar objects to enable interactions of users of the social networking system 130 to be correctly mapped to the social graph. Users of the social networking system 130 may interact with graph objects that are stored and indexed on the social networking system 130 like any other object on the social networking system, including commenting, sharing, expressing approval ("liking"), and tagging other users in the graph object. In this way, users may have conversations and share experiences about a certain song, artist, radio station, genre of music, movie, news article, actor, director, broadcasting company, or any graph object defined in the social networking system 130.

The graph integration module 160 may also provide a user interface that enables users of the social networking system 130 to collaboratively interact with external objects, such as music playing on an internet radio station. A user interface provided by the graph integration module 160 enables a viewing user to "listen in" on another user connected to the viewing user. In one embodiment, groups of users of the social networking system 130 may collaboratively listen to the same radio station, music playlist, or album that is hosted on one or more external systems 120. Certain users in the group may be designated as administrators and may select to switch to another radio station, music playlist, or album. In another embodiment, a song may be selected for a relationship page between two users of the social networking system by the two users. In yet another embodiment, users generating events on the social networking system 130, such as birthday parties, music concerts, and reunions, may include playlists, radio stations, and albums gathered from multiple external systems 120 using a user interface provided by the graph integration module 160. In a further embodiment, the graph integration module 160 may aggregate the graph objects and graph actions into a user interface that may be viewed on a user's profile on the social networking system 130. This user interface may include the user's recent actions, the user's top artists, songs, albums, playlists, and radio stations. The user interface may enable a viewing user of another user's profile to listen to songs from the user interface, streaming music hosted on an external system 120 from the user interface on that user's profile page on the social networking system 130, while generating graph actions on graph objects for the viewing user's profile. In this way, external user interactions are integrated into the social networking user experience.

Figure 1B:
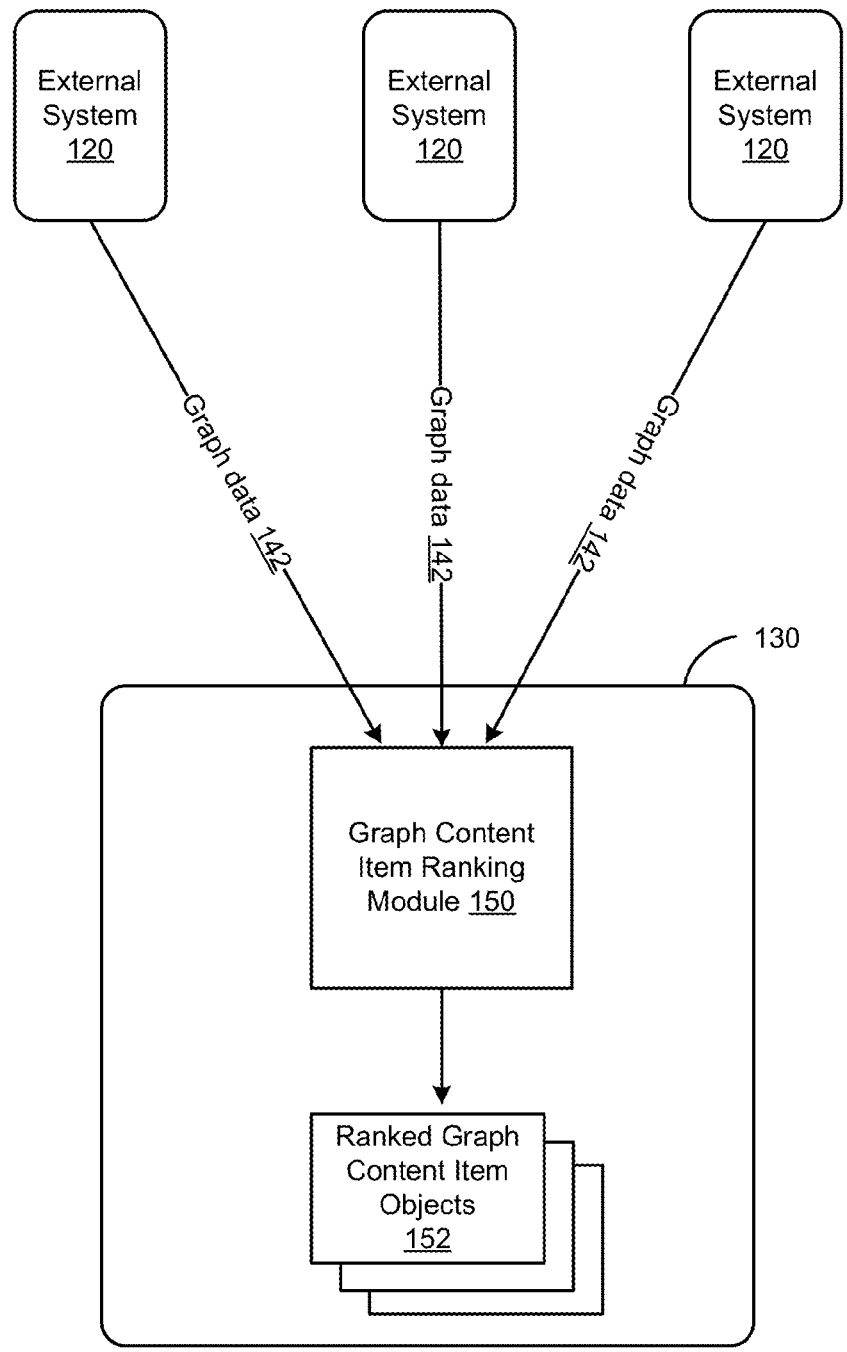
FIG. 1B is a high level block diagram of a process for ranking graph stories generated from external user actions outside of the social networking system, in accordance with an embodiment of the invention.

FIG. 1B is a high level block diagram of ranking graph content items generated from external user actions outside of the social networking system, in accordance with an embodiment of the invention. Here, multiple external systems 120 generate graph data 142 that is received by a graph content item ranking module 150. The graph data 142 includes information about actions and objects generated on the external systems 120, such as the date and time when an action was captured, objects (including users) associated with the action, location(s) where the action was performed, and the like, as well as the actions and objects generated on the external systems 120, in one embodiment. The graph content item ranking module 150 utilizes information about the actions and the objects to generate ranking scores for graph content item objects 152. These ranking scores may be used for ranking newsfeed stories in streams of users of the social networking system 130 to display more relevant newsfeed stories higher in the streams. Ranking scores may also be used by a recommendation plug-in that is embedded in external systems 120 that inform a viewing user of recommended graph objects based on the graph objects interacted with by other users of the social networking system connected to the viewing user, such as songs, movies, television shows, news articles, gaming applications and the like. This provides a better user experience to users of the social networking system because more relevant graph objects may be displayed to users, increasing the engagement of users of the social networking system.

To protect users of the social networking system 130 from unwanted applications "spamming" them with content items in their user experiences, content items generated on the external systems 120, or applications, are ranked by the graph content item ranking module 150 according to selected factors, including global factors, user-specific factors, and recommendation scores. Global factors may be considered "global" with respect to the social networking system 130, in one embodiment. Global factors may include whether an application is known to be spam, or known to be trusted, as well as a measurement of the quality of an application across the social networking system 130. In another embodiment, global factors are "global" with respect to the Internet by incorporating knowledge about spammers into the global factors. User-specific factors include whether a user has engaged with the application, whether the user has installed the application on the social networking system 130, and other characteristics of the user. Finally a recommendation engine computes recommendation scores for content items based on interactions of other users of the social networking system 130 that have viewed similar content items and their similarity to the viewing user. Using a combination of these factors and recommendation scores, a better user experience may be provided while also incorporating external user interactions on external systems 120. In one embodiment, the graph content item ranking module 150 may rank content items that include listen actions, song objects, and artist objects for viewing users of a user interface to recommendation songs to the viewing user.

Figure 2:
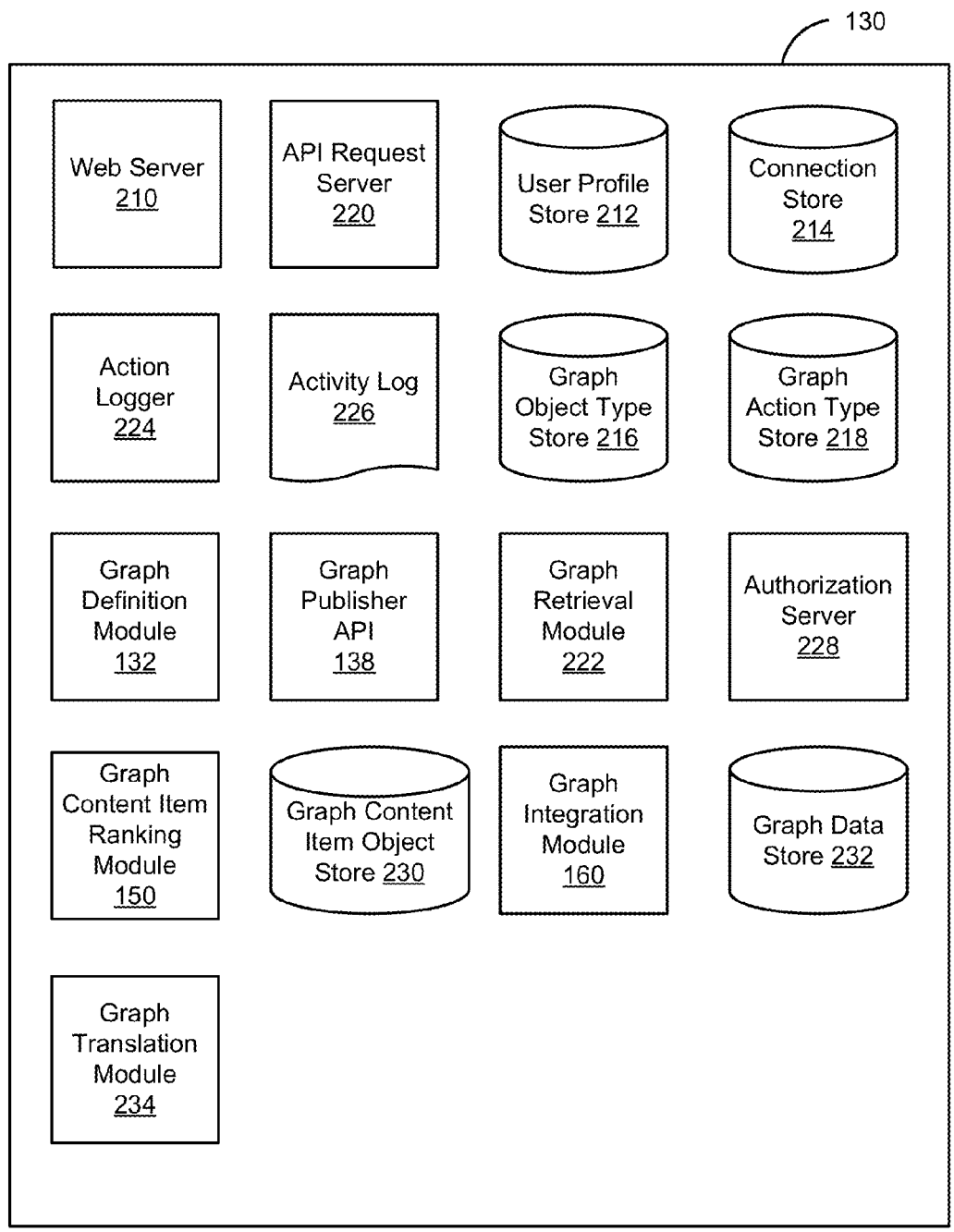
FIG. 2 is a diagram of a social networking system, in accordance with an embodiment of the invention.

FIG. 2 is a diagram of one embodiment of a social networking system 130. The embodiment of a social networking website 130 shown by FIG. 2 includes a web server 210, an action logger 224, an API request server 220, an activity log 226, a user profile store 212, a connection store 214, a graph object type store 216, a graph action type store 218, a graph definition module 132, a graph publisher API 138, a graph retrieval module 222, an authorization server 228, a graph content item object store 230, a graph content item ranking module 150, a graph integration module 160, a graph data store 232, and a graph translation module 234. In other embodiments, the social networking website 130 may include additional, fewer, or different modules for various applications. Conventional components such as network interfaces, security mechanisms, load balancers, failover servers, management and network operations consoles, and the like are not shown so as to not obscure the details of the system.

User profiles include biographic, demographic, and other types of descriptive information, such as work experience, educational history, hobbies or preferences, location, and the like that has been declared by users or inferred by the social networking system 130. This information is stored in a user profile store 212 such that each user is uniquely identified. The social networking system 130 also stores data describing one or more connections between different users in the connection store 214. The connection information may indicate users who have similar or common work experience, group memberships, hobbies, or educational history. Additionally, the social networking system 130 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 130, such as non-person entities, interests, pages, external systems, concepts, and the like are also stored in the connection store 214.

The web server 210 links the social networking system to one or more user devices 110 and/or one or more external systems 120 via the network 140. The web server 210 serves web pages, as well as other web-related content, such as Java, Flash, XML, and so forth. The web server 210 may include a mail server or other messaging functionality for receiving and routing messages between the social networking system 130 and one or more user devices 110. The messages can be instant messages, queued messages (e.g., email), text and SMS messages, or any other suitable messaging format.

The Application Programming Interface (API) request server 220 allows one or more external systems 120 and user devices 110 to access information from the social networking system 130 by calling one or more APIs. The API request server 220 may also allow external systems 120 to send information to social networking website by calling APIs. An external system 120, in one embodiment sends an API request to the social networking system 130 via the network 140 and the API request server 220 receives the API request. The API request server 220 processes the request by calling an API associated with the API request to generate an appropriate response, which the API request server 220 communicates to the external system 120 via the network 140. For example, responsive to an API request, the API request server 220 collects data associated with a user, such as the user's connections that have logged into the external system 120, and communicates the collected data to the external system 120. In another embodiment, a user device 110 communicates with the social networking system 130 via APIs in the same manner as external systems 120.

The action logger 224 is capable of receiving communications from the web server 210 about user actions on and/or off the social networking system 130. The action logger 224 populates the activity log 226 with information about user actions, enabling the social networking system 130 to discover various actions taken by its users within the social networking system 130 and outside of the social networking system 130. Any action that a particular user takes with respect to another node on the social networking system 130 is associated with each user's profile, through information maintained in the activity log 226 or in a similar database or other data repository. Examples of actions taken by a user within the social network 130 that are identified and stored may include, for example, adding a connection to another user, sending a message to another user, reading a message from another user, viewing content associated with another user, attending an event posted by another user or other actions interacting with another user. When a user takes an action within the social networking system 130, the action is recorded in an activity log 226. In one embodiment, the social networking system maintains the activity log 226 as a database of entries. When an action is taken within the social networking system 130, an entry for the action is added to the activity log 226. In one embodiment, the activity log 226 may be referred to as an action log.

Additionally, user actions may be associated with concepts and actions that occur within an entity outside of the social networking system 130, such as an external system 120 that is separate from the social networking system 130. For example, the action logger 224 may receive data describing a user's interaction with an external system 120 from the web server 210. In this example, the external system 120 reports a user's interaction according to structured actions and objects in the social graph. The received interaction may include, in one embodiment, a graph object and a graph action that were defined by a graph definition module 132. The action logger 224 would interpret the received interaction according to the definition of the graph action and graph object. For example, an action logger 224 may receive an interaction that includes a user's unique identifier, a graph action called "listen," and a graph object called "song." The activity log 226 would be populated with this received information. Other examples of actions where a user interacts with an external system 120 include a user expressing an interest in an external system 120 or another entity, a user posting a comment to the social networking system 130 that discusses an external system 120 or a web page 122a within the external system 120, a user posting to the social networking system 130 a Uniform Resource Locator (URL) or other identifier associated with an external system 120, a user attending an event associated with an external system 120 or any other action by a user that is related to an external system 120. Thus, the activity log 226 may include actions describing interactions between a user of the social networking system 130 and an external system 120 that is separate from the social networking system 130.

The authorization server 228 enforces one or more privacy settings of the users of the social networking system 130. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 120 or any entity that can potentially access the information. The information that can be shared by a user comprises user profile information like profile photo, phone numbers associated with the user, user's connections, actions taken by the user such as adding a connection, changing user profile information and the like.

The privacy setting specification may be provided at different levels of granularity. For example, the privacy setting may identify specific information to be shared with other users. For example, the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 120. One embodiment allows the specification of the set of entries comprise an enumeration of entities, for example, the user may provide a list of external systems 120 that are allowed to access certain information. Another embodiment allows the specification to comprise a set of entities along with exceptions that are not allowed to access the information. For example, a user may allow all external systems 120 to access the user's work information but specify a list of external systems 120 that are not allowed to access the work information. Certain embodiments call the list of exceptions that are not allowed to access certain information a block list. External systems 120 belonging to a block list specified by a user are blocked from accessing the information specified in the privacy setting. Note that the various combinations of granularity of specification of information and the granularity of specification of entities with which information is shared are possible, i.e., all personal information may be shared with friends whereas all work information may be shared with friends of friends.

The authorization server 228 contains logic to determine if certain information associated with a user can be accessed by a user's friends, external systems 120 and/or other applications and entities. An external system 120 that attempts to access a user's comment about a URL associated with the external system 120 may also need authorization from the authorization server 228 to access the user's more private and sensitive information, such as the user's work phone number. Based on the user's privacy settings, the authorization server 228 determines if another user, an external system 120, an application or another entity is allowed to access information associated with the user, including information about actions taken by the user. In one embodiment, the authorization server 228 uses a users privacy setting to determine if the user's comment about a URL associated with the external system 120 can be accessed by the external system 120. The user's privacy setting may specify which other users, or other entities, are allowed to receive data about the user's actions or other information associated with the user.

Additionally, the social networking system 130 maintains data about objects with which a user may interact with using the social networking system 130. To maintain this data, the user profile store 212 and the connection store 214 store instances of the corresponding type of objects maintained by the social networking system 130. Each object type has information fields that are suitable for storing information appropriate to the type of object. For example, the user profile store 212 contains data structures with fields suitable for describing a user's profile. When a new object of a particular type is created, the social networking system 130 initializes a new data structure of the corresponding type, assigns a unique object identifier to it, and begins to add data to the object as needed. This might occur, for example, when a user becomes a user of the social networking system 130, the social networking system 130 generates a new instance of a user profile in the user profile store 212, assigns a unique identifier to the user profile, and begins to populate the fields of the user profile with information provided by the user.

The connection store 214 includes data structures suitable for describing a user's connections to other users, connections to external systems 120 or connections to other entities. The connection store 214 may also associate a connection type with a user's connections, which may be used in conjunction with the user's privacy setting to regulate access to information about the user.

Data stored in the connection store 214, the user profile store 212 and the activity log 226 enables the social networking system 120 to generate a social graph that uses nodes to identify various objects and edges connecting nodes to identify relationships between different objects. An edge between two nodes in the social graph represents a particular kind of connection between the two nodes, which may result from an action that was performed by one of the nodes on the other node.

For example, if a first user establishes a connection with a second user in the social networking system, user profiles of the first user and the second users from the user profile store 212 may act as nodes in the social graph. The connection between the first user and the second user stored by the connection store 214 is an edge between the nodes associated with the first user and the second user. Continuing this example, the second user may then send the first user a message within the social networking system 130, which is identified by the action logger 224 and stored in the activity log 226. The stored action of sending the message is another edge between the two nodes in the social graph representing the first user and the second user. Additionally, the message itself may be identified from the activity log 226 and included in the social graph as another node connected to the nodes representing the first user and the second user.

In another example, a first user may tag a second user in an image that is maintained by the social networking system 130 (or, alternatively, in an image maintained by another system outside of the social networking system 130). The image may itself be represented a node in the social networking system 130. This tagging action may create edges between the first user and the second user as well as create an edge between each of the users and the image, which is also a node in the social graph. In yet another example, if a user confirms attending an event, the user and the event are nodes obtained from the user profile store 212, where the attendance of the event is an edge between the nodes that may be retrieved from the activity log 226. By generating and maintaining the social graph, the social networking system 130 includes data describing many different types of objects and the interactions and connections among those objects, providing a rich source of socially relevant information.

Building upon this understanding of a social graph, which comprises nodes and edges, the social graph can be "opened" by enabling third-party developers and external systems 120 to define objects and actions to be published to the social graph. As illustrated in FIGS. 1A and 2, a graph definition module 132 includes a graph action module 134 and a graph object module 136. The graph definition module 132 enables the creation of actions and objects that imitate real-world interactions. An action such as "listen" may include various properties, such as a location where the action took place, the user or users taking part in the action, and a time duration field to record how long the user performed the action. The resulting graph action type may, in one embodiment, be stored in the graph action type store 218. Objects such as "song," "artist," "genre," and "radio station" may be defined using the graph object module 136 to have object properties, such as auditory object type, musical object type, performing arts object type, and the like. These graph object types are stored in the graph object type store 216.

In one embodiment, the graph definition module 132 defines certain actions to be performed on certain objects. For example, an administrator of the social networking system 130 may define the "listen" action to only be performed on auditory object types, such as "song," "artist," "genre," and "radio station" objects. Thus, a third-party developer that may desire to define a "speech" object that users can perform the action, "listen" may define his "speech" object as an auditory object type such that the "listen" action may be performed on it.

In another embodiment, the graph definition module 132 enables actions to be performed on any object, leaving the semantics to the third-party developer who utilizes actions and objects on the markup language document 114 that is interpreted by the widget 124. Thus, in this embodiment, a third-party developer may utilize the "listen" action with a "user" object in a voice-over-IP application phone call between a user of the social networking system 130 and a user of the voice-over-IP application. If the user of the voice-over-IP application is not a user of the social networking system 130, then only the information received from the external system 120 may be used in the activity log 226 to be published in the newsfeed or stream in the social networking system 130. Thus, context-free grammars may be utilized to capture external user interactions and integrate them into the social networking system 130.

A graph publisher API 138 assembles received actions and objects into newsfeed stories or other content items in the stream of content items in the social networking system 130, in one embodiment. In another embodiment, the graph publisher API 138 responds to an API call from an external system 120 to retrieve user interactions on the external system 120. The graph publisher API 138 utilizes the definitions of the actions and objects to determine how to publish the data into the social graph of the social networking system 130. In one embodiment, the markup language document 114 includes an instruction to the social networking system 130 to publish every action taken on the external system 120 as a newsfeed story or content item in the stream. In another embodiment, the markup language document 114 includes an instruction to the social networking system 130 to publish actions taken on the external system 120 in batches or in aggregate. Note that the social networking system 130 may passively publish these content items into the user's stream on the social networking system 130 because of prior authorization provided to the external system 120. If such authorization to post content items into the stream has not been given by the user, then a dialog box requesting permission would prompt the user.

A graph translation module 234 enables the social networking system 130 to dynamically form sentences based on the structured objects and actions generated on external systems. A basic semantic understanding of the action types and object types defined by the graph definition module 132 may be achieved by attaching verb tenses and noun forms to the action types and object types. By applying rules of grammar to verb tenses and noun forms of the actions and object generated on external systems, the graph translation module 234 may form grammatically correct sentences without intervention from third-party developers or administrators of the social networking system 130. For example, an action type in singular past tense, or simple past tense, may be used to denote a user as the actor performing the action of the action type in the past. An object type may be in either singular or plural noun form, and is acted upon by the actor performing the action. Thus, "Franc completed 100 miles with iMapMyRun" is a grammatically correct sentence that can be determined by the graph translation module 234.

In the running application described above, a "complete" action type may operate on a "run" object type and a "miles" object type. Multiple verb tenses may be gathered during the definition of the action type, including a singular present tense, a plural present tense, a singular past tense, and a plural past tense. Similarly, noun forms may be gathered during the definition of the object type, including a singular noun form and a plural noun form. The graph translation module 234 retrieves verb tenses and noun forms from the action types and object types stored in the graph action type store 218 and the graph object type store 216.

In coordination with the graph publisher API 138, the graph translation module 234 forms sentences based on the information available at the time of sentence formation, in one embodiment. For example, the running application may be configured to post a newsfeed story, or timeline unit, into a stream in the social networking system 130 each time a user completes 100 miles using the application. The graph translation module 234 may utilize the correct verb tense and noun form for the action type "complete" and object type "miles" in posting a story that indicates "Franc completed 200 miles on iMapMyRun." Additionally, the graph translation module 234 may also vary the sentence structure to create a call to action news story, such as "Complete 300 miles with Franc on iMapMyRun!" In another embodiment, newsfeed stories may be formed using information gathered during any particular time period.

In coordination with the graph retrieval module 222, the graph translation module 234 may dynamically provide content for various data visualizations without additional input from external systems, third-party developers, or administrators of the social networking system. In presenting the data visualizations, sentences describing the data may be formed using the verb tenses of the action types and the noun forms of the object types. For example, Franc and five of his friends on the social networking system 130 may use a running application that operates on an external system, such as a website, to track workouts, calories burned, elevations climbed, and the like. This rich dataset of information may be captured utilizing custom object and actions, as described above. The graph retrieval module 222 and the graph translation module 234 may be used in conjunction to generate interesting data visualizations based on user-specified queries, such as the total number of calories burned by Franc and his five friends, the average speed of their runs, which among them is the fastest runner, and so on.

A graph content item ranking module 150 utilizes graph data 142 and information gathered from other modules of the social networking system 130 to generate ranking scores of stories personalized for viewing users. Traditionally, content items have been ranked depending on the types of actions from other users of the social networking system 130 that a viewing user generally prefers, as indicated from observing click-through rates, sharing behaviors, and engagement patterns. Here, the graph content item ranking module 150 utilizes metadata about objects generated on external systems 120, such as applications that indicate a number of miles run during a workout or top artists listened to this week. The metadata about these objects, for example, artist objects and workout objects, may be utilized by the graph content item ranking module 150 to rank the content items generated from these external user interactions, in one embodiment. The metadata about these objects may be published to a newsfeed stream, added to a user's profile, or displayed via a plug-in (e.g., an iframe) on an external system, in certain embodiments.

The graph content item ranking module 150 utilizes several factors in calculating a ranking score for content items to be displayed to a viewing user, including global factors, user-specific factors, and a recommendation score. Global factors apply to all applications and/or external system 120 that interface with the social networking system 130. Separate modules of the social networking system 130 may determine a reputation score for applications and/or external systems 120 to identify spam, or unwanted applications. An application's reputation score, indicating a likelihood of spam, is utilized by the graph content item ranking module 150 in determining ranking scores for content items generated by the application. The reputation score may be determined from a number of factors, including behavior of the application gathered from heuristics analysis, reports from users that the application is spam, annoying, or offensive, and blacklists that indicate the application is spam.

Another global factor that may be applied to a graph content item ranking score is an overall quality of an application that produces the content item. The quality of an application may be determined via separate modules, and the factors considered in judging the quality of an application may include user engagement with the application, popularity of the application among all users of the social networking system 130, consistency of the application behavior observed by the social networking system 130, reputation of the authors of the application, and an average rating of the application by users and administrators of the social networking system 130. In one embodiment, the overall quality of an application may be represented as an application quality score, and the application quality score is taken as a factor in ranking content items for display to a viewing user.

User-specific factors may also be applied to the ranking of a graph content item. These user-specific factors include weights to other users connected to the viewing user and weights to applications and interests that are preferred by the viewing user. For example, a viewing user may have over 1000 connections to other users on a social networking system 130, but may only interact with 20 of those users on a daily basis through sharing, commenting, expressing approval of and selecting links embodied within content items generated by the subset of users. Thus, content items from those users in the subset may be ranked higher by the graph content item ranking module 150. Additionally, content items generated by applications that are preferred by the viewing user, as determined from observed click-through rates, whether the user has installed the application generating the content item, time elapsed since interacting with the application, and number of interactions with the application, may also be ranked higher by the graph content item ranking module 150. A viewing user's preferences for applications, interests, and other concepts may be stored as affinity scores in a user profile object associated with the viewing user in the user profile store 212.

As an example, a viewing user may be very interested in Lady Gaga, as indicated by an affinity score for Lady Gaga in the user profile object associated with the user. Affinity scores may be computed by separate modules for various interests, nodes, and users of the social networking system 130 based on an explicitly stated interest by users on their profile pages or implied interest by actions of users and their connections on the social networking system 130 and external systems 120. In one embodiment, the artist object for Lady Gaga is associated with the viewing user's user profile object with a high affinity score. Content items associated with Lady Gaga that were generated on an external system by users connected to the viewing user would be ranked higher by the graph content item ranking module 150 because of the viewing user's affinity for the artist object associated with Lady Gaga. Additionally, content items involving artist objects for which the viewing user's connections on the social networking system 130 have high affinity scores may also be ranked higher based on the adjacency of those artist objects with the viewing user. As a result, content items generated from various external systems, such as an achievement by a connected user on a gaming application that utilizes the Lady Gaga brand, a new music video by Lady Gaga being watched by another connected user on a video sharing website, and an album review of the new Lady Gaga LP submitted by another connected user on an external website may be ranked higher than other content items generated by user interactions on external system 120.

The graph content item ranking module 150 may include a recommendation engine highlights objects that may be of interest to a viewing user based on past interactions with other objects, the expressed interests of the viewing user, and the past interactions with other objects by other users connected to the viewing user. Object-to-object similarity analysis may be determined by the recommendation engine asynchronously. Additionally, the recommendation engine may keep track of what object types have been displayed to a user and, in an effort to diversify the object types presented to the user, it may also recommend object types that have not been recently displayed, in one embodiment. Recommendations may influence a ranking score generated by the graph content item ranking module 150 in varying intensities, such as by increasing a ranking score exponentially, linearly, or logarithmically. In one embodiment, an object owner, brand owner, or other third-party may purchase a boost in the ranking score through a user interface on the social networking system. For example, a purchase of a book on an electronic retailer that was communicated to the social networking system as a graph action instance performed by a user of the social networking system may be boosted in the rankings of recommendations to a viewing user connected to the user if the publisher of the book purchased a premium placement for the book within the recommendations for the viewing user of the social networking system.

Graph data 142 may be stored and indexed in the graph data store 232. The graph data store 232 includes data structures suitable for describing the graph data 142 received from external system 120. In one embodiment, graph data 142 may be received from within the social networking system 130, such as users sharing stories with other users that include graph data 142, users playing a song that was shared within their newsfeed stream of stories on the social networking system 130, users purchasing a product from within an application on the social networking system 130, and users watching a video from a playlist that was shared in a message from other users of the social networking system 130. Graph data 142 may include custom graph actions, actors (users performing custom graph actions), custom graph objects, and properties of the custom graph actions and custom graph objects that have been defined by entities external to the social networking system 130. When graph data 142 is received, the social networking system 130 may search for the graph data 142 in the graph data store 232 and add data to the object as needed. This might occur, for example, when a user listens to a song previously listened to on an external system 120. In this case, the graph data 142 corresponding to the song object may be modified to reflect the new listen action. The graph integration module 160 may interact with the graph data store 232 to provide a user interface on the user's user profile page on the social networking system 130 that reflects the new listen action. Because graph data 142 may be collected about similar objects from multiple domains, such as Spotify, iTunes, Pandora, and RDIO, a virtual object may be created by the social networking system 130 and stored in the graph data store 232. As listen action instances are received from multiple domains performed on the same song, as identified by the social networking system 130 by the title of the song, artist name, album name, and duration, the graph data store 232 is accessed to identify the virtual object that represents the song objects that are associated with the listen action instances. The listen action instances are then associated with the virtual object created by the social networking system 130 that represents the similar song objects as determined by the social networking system 130. In this way, the social networking system 130 may report a newsfeed story that includes the listen action and the virtual object for a particular song, such as "Baby" by Justin Bieber, regardless of whether the song was listened to on Spotify, iTunes, Pandora, or RDIO. In one embodiment, the newsfeed story may include the domain, or music service, on which the song was listened to, but may enable the user to playback the song on a different domain or music service from within the newsfeed story on the social networking system. In another embodiment, a user may add a geographic location to a custom graph action instance, indicating where the graph action was performed. Virtual objects may be generated by a social networking system 130 for other types of custom graph objects, such as news stories, commercial products, videos, concerts, theatre shows, television shows, and so on.

The graph integration module 160 utilizes action types and object types defined by the graph definition module 132 that are stored in the graph object type store 216 and graph action type store 218 to integrate user interactions on external systems 120 with the social networking system 130. For example, a streaming music service may enable users to listen to internet radio stations on an external system 120, such as a website or a mobile application. In one embodiment, the social networking system 130 may associate buttons and links on user interfaces with requests sent to an embedded web server on an external system 120 hosting the streaming music service. The requests trigger the actions requested, such as playing and pausing a song or music playing on a radio station. This enables further integration with the user experience on the social networking system 130, such as integrating music streaming into a chat application or chat interface on the social networking system 130, enabling users to listen to the same song or radio station playing on the external system 120 via the social networking system 130, posting visualizations of the interactions with the external system 120, such as a content item that reads "Joe and 5 of your friends just listened to Party Like a Rockstar on Pandora Radio," sending messages, such as push notifications on a mobile phone and email messages, that a user has "tagged" or created a selectable link to another user in an interaction with the external system 120, and generating a page on the social networking system 130 that captures all interactions with an object on an external system 120 such as a song. These features enhance the user experience because, instead of merely knowing the name of one song that was listened to and subsequently having to search for that song on the Internet, viewing users may quickly listen to that song simply by clicking on the link associated with the song object from within the social networking system via a user interface. The selection of the link generates a request to the external system 120 to execute the action, in this case playing the song through the user device 110 accessing the social networking system 130 via the network 140.

Further, the graph integration module 160 enables specialized targeting of advertisements based on graph data 142 being received from the external systems 120, such as a song object that is currently being listened to or recently listened to by a viewing user or connections of the viewing user. The graph integration module 160 provides analysis of the graph data 142 and feeds that information into targeting criteria modules on the social networking system 130. For example, advertisements for music concerts may be targeted to users based on whether the user is located near the concert venues and whether they recently listened to songs by artists playing the concerts or similar to those artists. Advertisers may further analyze the information gathered from the graph data 142 and analyzed by the graph integration module 160 to generate more relevant advertisements.

In one embodiment, the graph integration module 160 may also utilize the graph content item ranking module 150 to provide recommendations of graph data 142, such as songs, artists, and genres, to users of the social networking system 130 based on a number of factors, including the song and artist preferences of the users, heuristics analysis of user behavior to determine other listening preferences, and listening patterns of the users' connections on the social networking system 130. For example, users that have high affinity scores for each other as a result of high click-through rates on links associated with the users, frequent interactions on the social networking system, and other such factors, may affect weights in the recommendation of songs by those users. The graph content item ranking module 150, in one embodiment, may provide a ranking model for recommending graph objects based on object metadata stored in the social networking system 130.

A graph retrieval module 222 may be utilized by third-party developers to query the social graph for data visualizations of the received actions on external systems 120. For example, if a third-party developer wanted to display the most frequently listened to songs on an external system 120 among a user's friends in the social networking system 130, the graph retrieval module 222 may be used to generate that query. Administrators of a social networking system 130 may develop basic queries such as this and others, including a "sum" query that totals the number of units of an object that has been performed. For example, a running application may record the number of miles a user has run per workout. A "miles" object may record this value such that a "sum" query could return the total number of miles completed by the user. Other queries may be generated by third-party developers and administrators of the social networking system 130 to answer interesting questions such as "What is the birth year of artists that a user listens to the most?" Because an "artist" object may be linked to a "birth year" object by the third-party developer who defined the "artist" object, for example, a query may be executed to answer this question using the graph retrieval module 222. By opening up the social graph to third-party developers and external systems 120 and providing structure to the actions that may take place outside of the social networking system 130, users of the social networking system 130 benefit by sharing and discovering socially relevant information on the social networking system 130. Another benefit of providing structure to actions occurring outside of the social networking system 130 is generating additional inputs for targeting advertisements and enhancing the user experience with interesting data visualizations based on user activity on external system 120.

A graph content item object store 230 maintains graph content item objects that are generated as a result of external user interactions with external systems 120. A graph content item ranking module 150 computes a ranking score for graph content item objects for users of the social networking system 130 that may potentially view the graph content items. Based on the user profile objects associated with the potential viewing users, the ranking scores for graph content items vary based on the individualized preferences of the viewing users. In one embodiment, graph content item objects stored and indexed in the graph content item object store 230 are associated with user-independent story vectors that includes values for parameters of categories regarding the content items. It can be appreciated by one having skill in the art that vectors may include any data structure that holds information, such as arrays, matrices, and database objects.

Defining a Structure and Grammar for Graph Actions and Graph Objects

Figure 3A:
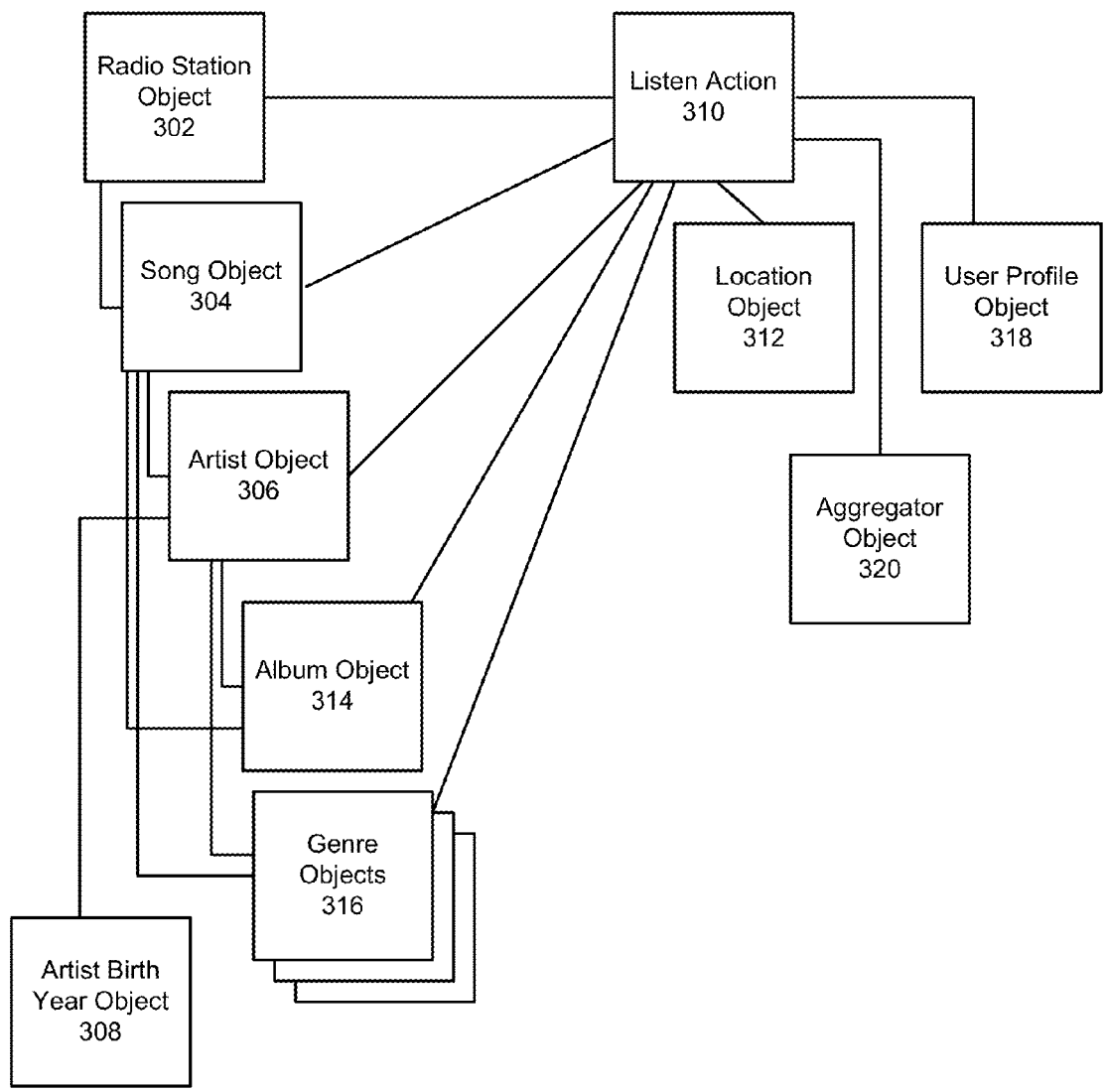
FIG. 3A is a high level block diagram of a defined graph structure representing an external user action outside of the social networking system, in accordance with an embodiment of the invention.

FIG. 3A is a high-level block diagram of a defined graph structure representing a graph action and its relationship to graph objects as defined by an entity external to the social networking system, in accordance with an embodiment of the invention. Although only one action is illustrated, the listen action 310, a whole universe of actions is available to be defined within the social networking system 130. For example, users may read, purchase, sell, watch, want, play, achieve, take, recommend, review, visit, and comment on various objects, such as products, music, sporting matches, and movies. Entities external to the social networking system 130 may define these graph actions and graph objects for publishing into a social graph on the social networking system 130. The graph actions and graph objects may be performed by users on external systems 120 as well as on the social networking system 130.

As illustrated in FIG. 3A and discussed above, an example embodiment involves listening to music on an external system 120, such as an internet radio website. The listen action 310 may be defined for other external systems 120, including a stand-alone desktop application connected to a network 140, podcasts, terrestrial radio stations broadcasting through the Internet, a virtual music locker website, and a music streaming subscription service website. As mentioned above, in some embodiments, actions such as the listen action 310 can be defined to be open-ended so that new objects, such as playlists, podcasts, and streaming libraries, though not pictured, may be acted upon by the listen action 310. The listen action 310 may be defined by an entity external to the social networking system 130 through a tool provided by the social networking system 130, in one embodiment, that enables the entity to define action properties, including the types of objects that are associated with the listen action 310 type. The tool may expose a new action type on a web page on the social networking system 130 to enable entities external to the social networking system 130 to access the new action type.

Graph objects may be defined by an entity external to the social networking system 130 to include object properties. Object properties of a song object 304 may include a title, a duration, an artist object 306, an album object 314, and several genre objects 316, for example. Object properties of an artist object 306 may include an artist name, an album object 314, several genre objects 316, and an artist birth year object 308, for example. A radio station object 302 may include an association with a song object 304 that is created by an application. For example, a radio station object 302 may include a playlist of multiple song objects 304 that are to be played for users listening to the radio station associated with the radio station object 302. In one embodiment, objects have standard object properties, such as a title, description, image, and URL. Other object properties may be defined by the entity external to the social networking system 130. In this way, multiple different objects may be related to each other.

A radio station object 302 may be defined as having a name, such as "99.7 FM" or "Britney Spears Channel." The radio station object 302 may include properties, such as being owned by a corporation, being broadcast on specific internet URLs, etc. The radio station object 302 is linked to a song object 304. A song object 304 represents one song that has played on the radio station. The song object 304 is linked to an artist object 306 that performs the song. The artist object 306 may be linked to an artist birth year object 308 that represents the birth year that the artist was born. For example, if an artist object 306 represented "Britney Spears," then the artist object 306 would be linked to the "1981" birth year object 308 because the third-party developer would know that Britney Spears was born in 1981. Similarly, the owner of the song object 304 for "Till the World Ends," a song by Britney Spears, would also associate that song object 304 with the album object 314 for "Femme Fatale" and genre objects 316 for "pop," "dance-pop," and "electropop." Such information may be manually defined or automatically associated using information about the graph objects stored in databases.

A third-party developer for the internet radio website may define objects for the radio stations, songs, artists, artist birth years, albums, and genres as described above using a tool provided by the social networking system 130, in one embodiment, or by describing objects in web pages on external systems 120 in markup language documents using tags in another embodiment. A listen action 310 may be defined by the same or another third-party developer or by an administrator of the social networking system 130. The listen action 310, like most actions, can be associated with a location object 312 to identify and record a geographic location where an action has taken place. The listen action 310 can also be associated with a user profile object 318 for the user that is performing the action. Finally, a property of the listen action 310 may include an aggregator object 320 that identifies how many times the listen action 310 has been performed. In one embodiment, this number of performed actions may be broken down by user, by location, by groups of users, or by any identifiable node in the social networking system 130.

In one example, a user of a social networking system 130 visited an internet radio website and had already given permission to share actions taken on the internet radio website hosted on the external system 120. The third-party developer may encode tags in a markup language document to create graph object instances in the social networking system 130 as users perform actions on the internet radio website, such as listening to radio stations. As a user listens to music on the internet radio website, a listen action 310 may be recorded in an action log or communicated to the social networking system in association with the user profile object 318 for the user. The action log may include a user identifier, an action type of the graph action, an object identifier, time, date, and other metadata, such as object properties and action property values, such as how long the user listened to a song before skipping it. If the user is using a mobile device with GPS capability or if geographic location is otherwise available, then a location object 312 for that location may be associated with the listen action 310.

An aggregator object 320 may be associated with the listen action 310 to keep a count of how many times the action has been performed. In one embodiment, any object, such as a radio station object 302, song object 304, artist object 306, album object 314, genre objects 316, may be configured by a third-party developer or administrator of the social networking system as objects that may be aggregated upon. Because the graph structure is completely customizable, aggregation, as well as other statistical functions such as summation, frequency, distance, averages, and deviances from norm, may be performed on specified objects. For example, interesting data, such as the number of hours spent listening to Lady Gaga, represented by an artist object 306, may be determined from a simple query of the structured graph actions and graph objects and may be calculated on any set of users of the social networking system 130. As the user listens to a song on a radio station, the listen action 310 may be associated with the corresponding radio station object 302, song object 304, as well as the linked artist object 306, album object 314, and genre objects 316 for the song. The artist birth year object 308 is not directly linked to the listen action 310, but instead, is directly linked to the artist object 306. Thus, a specialized query may be utilized to generate interesting data visualizations, such as the top artists listened to, sorted by birth year.

Figure 3B:

FIGS. 3B-3J illustrate screenshots of a tool on a social networking system 130 for third-party developers or administrators of the social networking system to define a graph structure for user interactions on external systems. FIG. 3B illustrates a screenshot of a web application on the social networking system that enables definition of action types and object types on an external system. In this embodiment, the external system 120 is an application 330 called "The Matchbook." An action type field 332 and an object type field 334 enable the third-party developer or administrator of the social networking system 130 to define a graph structure. A button 336, when clicked, generates an action type and an object type in the social networking system 130. In this example, a "play" action type that performs on a "tennis match" object type is being defined.

As shown in FIG. 3C, an action type can have various verb forms and other properties as defined by the third-party developer or administrator of the social networking system defining the graph structure. In the action type name field 338, the name of the action type can be changed. Additional object types may be included in the object field 340. A preview of the action stories, or timeline units, may be displayed. Here, the first example story 342 displays the action type in a singular past tense while the second example story 344 displays the action type in a plural past tense. In FIG. 3C, a radio button for supporting present tense verbs is unchecked, so those verb forms are currently undefined.

Figure 3D:
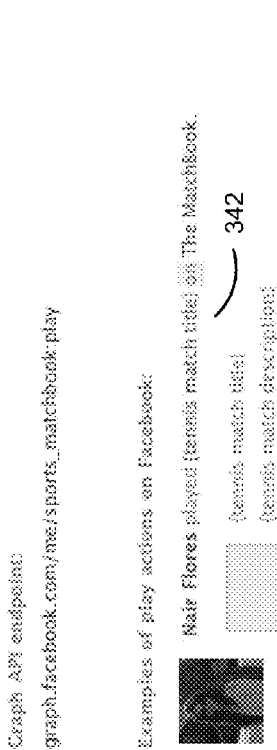
Figure 3D:
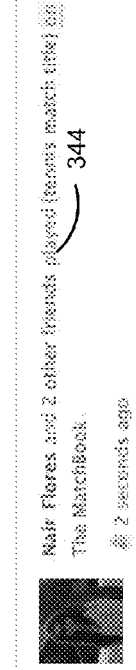
Figure 3D:
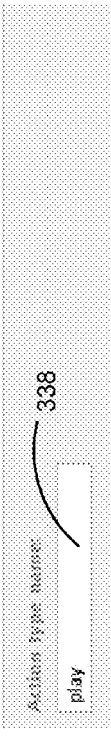
Figure 3D:
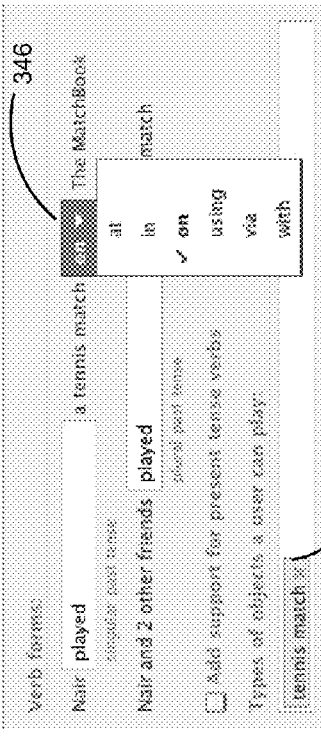
Figure 3D:
Figure 3E:
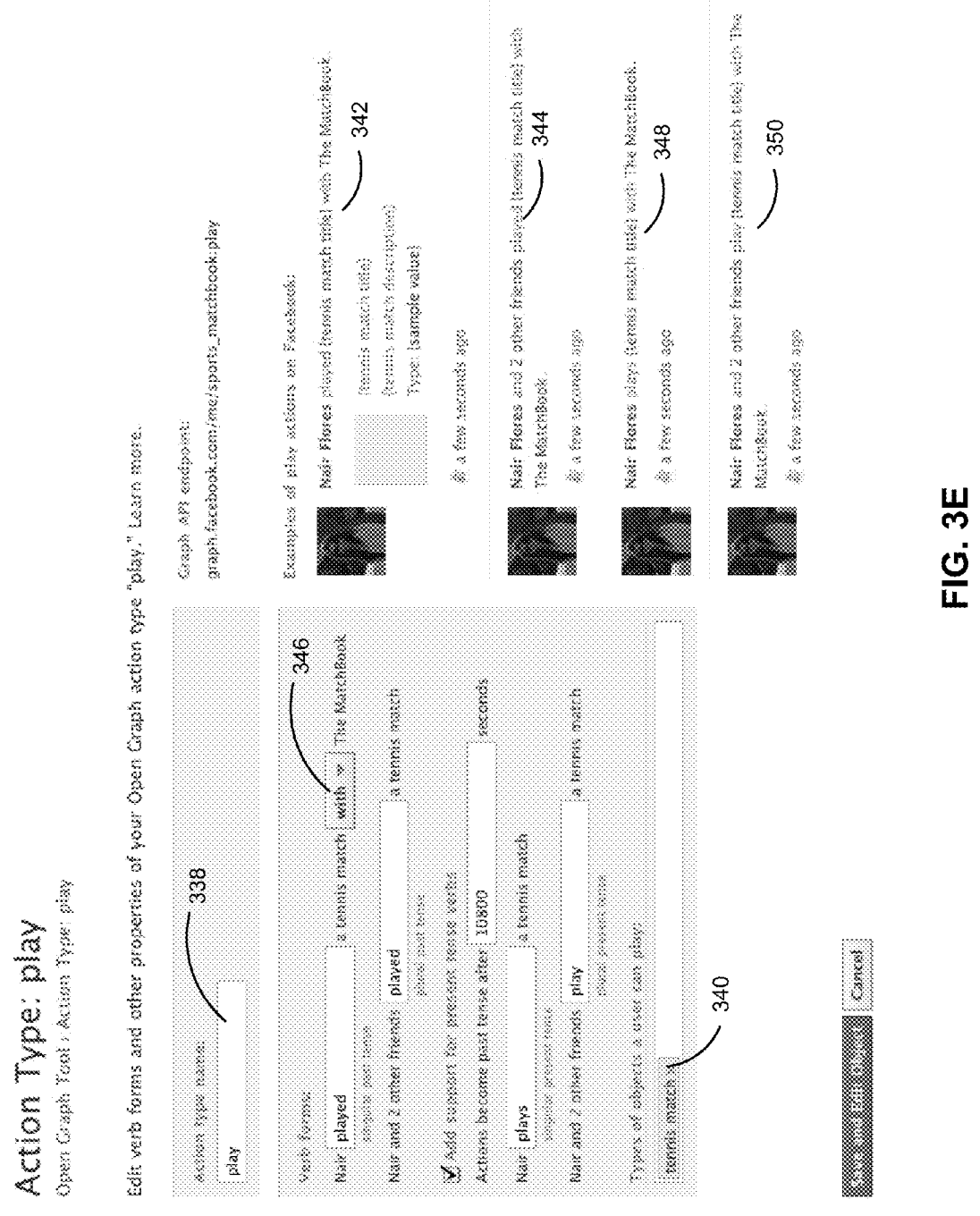

FIG. 3D illustrates a drop down menu 346 for the preposition used to describe the action type and object type in relation to the external system 120. The first example story 342 and the second example store 344 are updated based on the selection of the preposition in the drop down menu 346. Different prepositions, such as "at," "in," "on," "using," "via," and "with," may indicate different sentence structures available. FIG. 3E shows another embodiment of the action type definition tool in which support for present tense verbs are added to the action type. A third example story 348 displays the action type in singular past tense while the fourth example story 350 displays the action type in plural past tense. FIG. 3E also illustrates a field in which an administrator can set a time period after which actions become past tense. This time period may be utilized by the graph translation module 234 to select between present tenses and past tenses of action types for forming sentences for data visualizations. In another embodiment, the time period after which actions become past tense may be inferred through meta tags, such as a "duration" tag on a song object, and the inferred time period may be passed directly on the object by the social networking system 130. In forming sentences for stories in a newsfeed on the social networking system 130, this tool enables the social networking system 130 to automatically form sentences that make sense using the correct tense of the verb. Incorrect sentences appearing in a newsfeed story lessen the appeal and relevance of the newsfeed story, potentially encouraging users to disengage with a particular brand. However, more relevant newsfeed stories, such as a news story that is currently being read by another user connected to a viewing user, may spark a discussion about the news story in real-time on the social networking system, such as via a chat message or wall post, thus providing a more engaging user experience. Similarly, a viewing user of the social networking system 130 that reads a newsfeed story that indicates that other users connected to the viewing user are currently listening to a new Justin Timberlake song, the viewing user may opt to join those other users in listening to the song through the social networking system 130 from within the newsfeed story. In both examples, the present tense of the verb in the newsfeed story created opportunities for a viewing user to become more engaged with the social networking system 130. Further, a social networking system 130 may rank and/or aggregate newsfeed stories that occurred in the past to present to viewing users of the social networking system 130. The ranked and/or aggregated newsfeed stories will have happened in the past, so the newsfeed stories necessarily should be expressed in the past tense. Because the sentences formed by the social networking system may delineate between more recent events and past events automatically, the user experience is more engaging and relevant.

Figure 3F:
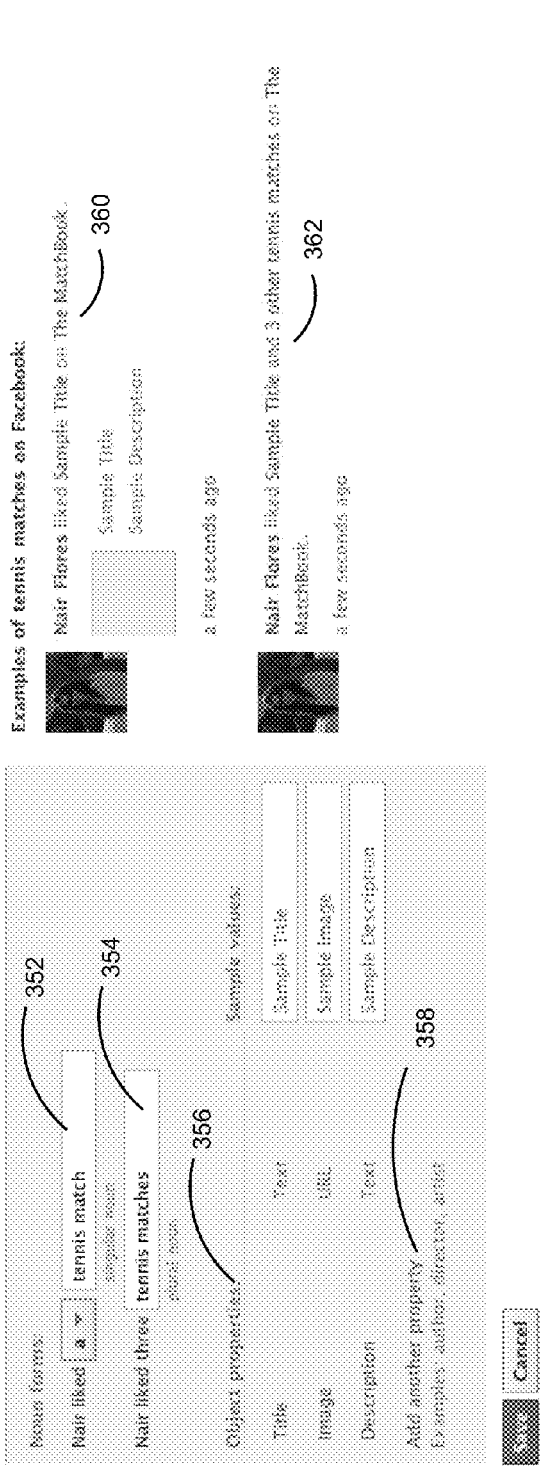

FIG. 3F illustrates a tool for defining an object type in a graph structure for an external system for publishing on a social networking system 130 or publishing on an external system 120 on a domain outside of the social networking system 130. In this example, a "tennis match" object type is being defined. A singular noun form field 352 and a plural noun form field 354 enable the third-party developer or administrator of the social networking system 130 to specify the noun forms of the object type in a sentence for publishing in the social networking system 130. Here, "tennis matches" is the plural noun form for this object type. FIG. 3F also illustrates object properties 356 of the object type being defined. Several properties may be structured by the social networking system 130, such as title, image, and description. Additional properties may be defined by clicking on a link 358 to include customized properties of the object type. As described in FIG. 3A, an object type, such as a "song" object type, may have multiple properties, including other object types, such as an "artist" object type, "album" artist type, and "genre" object types. As shown in FIG. 3F, these additional properties may be added to the object type being defined on the social networking system 130. A singular object type example story 360 and a plural object type example story 362 are also illustrated in FIG. 3F.

Figure 3G:
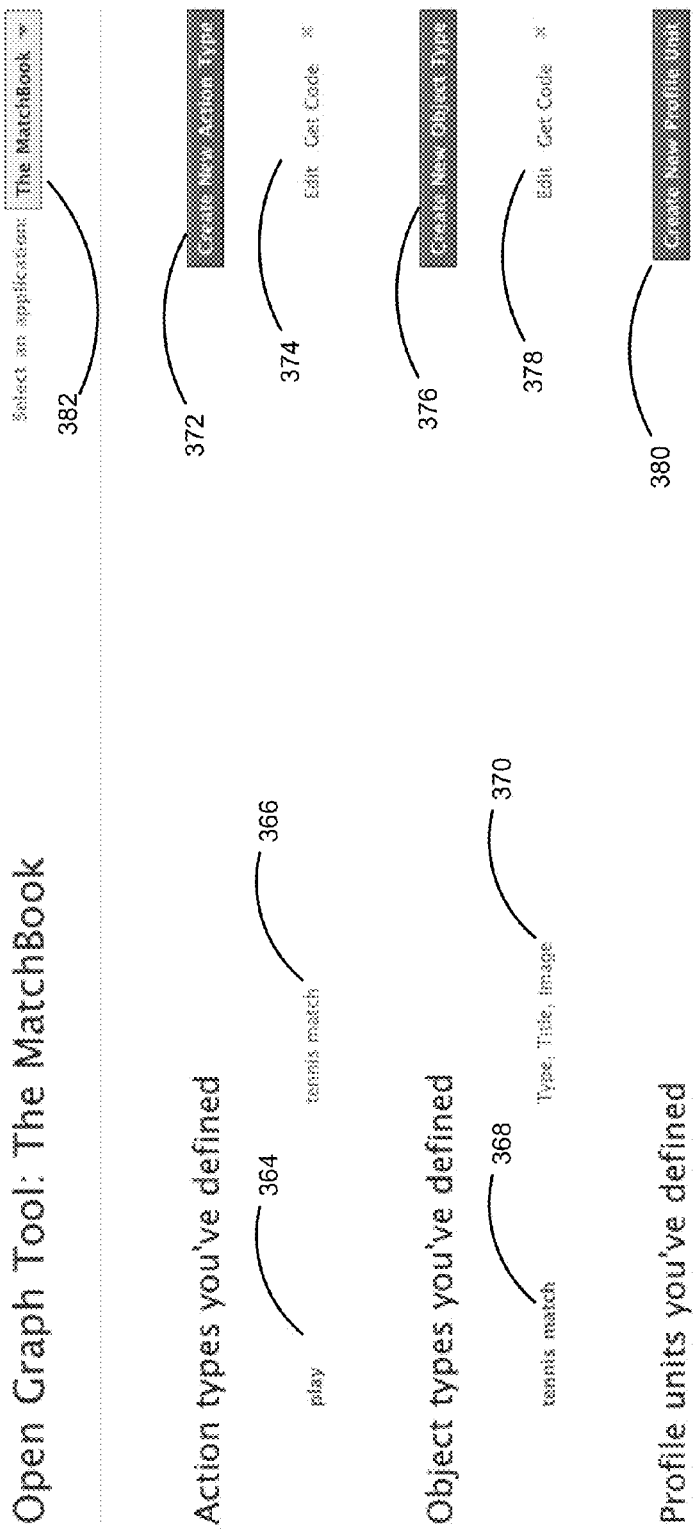

FIG. 3G illustrates a tool on the social networking system 130 that enables third-party developers or administrators of the social networking system 130 to manage and create action types and object types that define a graph structure for user actions occurring on an external system 120. A drop down menu 382 enables the third-party developer or administrator of the social networking system to select the graph structure being managed. Here, a link 364 displays that a "play" action type has been defined that acts on a "tennis match," as indicated by the text 366 following the link 364. Also, a link 368 displays that a "tennis match" object type has been defined that has the object properties of "Type, Title, Image" as indicated by the text 370 following the link 368.

Further, FIG. 3G illustrates buttons and links that enable a third-party developer or administrator of the social networking system 130 to create and edit action types, object types, and/or profile units as well as generate code snippets for inclusion on external systems to capture external user actions for publishing to the social networking system 130. An entity external to the social networking system 130 may include a button on a web page on an external system that, when clicked by a user of the social networking system 130, generates a graph action instance having a custom graph action type as determined by the entity. The code snippets that may be provided by the social networking system 130 via the buttons and links illustrated on FIG. 3G may be incorporated into a markup language document for a web page on the external system. For example, a "wishlist" button may be included on a web page for a consumer electronics device on an e-commerce website. When a user of the social networking system 130 clicks on the "wishlist" button, an "add" action instance may be recorded in an action log, along with an identifier for the graph object for the consumer electronics device. In other embodiment, an entity external to the social networking system 130 may record a graph action instance in an action log based on other types of events, such as clicking on a link, receiving a touch from a touch-screen interface, and a predetermined amount of time elapsing since the viewing user loaded the web page.

FIG. 3G illustrates various links and buttons that may be used by third-party developers in defining a graph structure on a social networking system 130. A button 372 enables definition of a new action type, while links 374 enable the third-party developer or administrator to edit or get the code for the action type that has been defined. The "get code" link 374 for the action type, in one embodiment, provides a code snippet that includes an application programming interface (API) call that includes the parameters needed to identify a "play" action instance on the external system 120 as a user performs that action on the external system. In another embodiment, the "get code" link 374 provides a code snippet that includes meta tags to be included in a markup languages document that includes the parameters needed to identify the "tennis match" object instance as the play action occurs on the external system 120 as an event, such as clicking a button or a link. Similarly, a button 376 enables definition of a new object type, while links 378 enable the third-party developer or administrator to edit or get the code for the object type that has been defined. In one embodiment, the "get code" link 378 provides a code snippet that includes meta tags to be included in a markup languages document that includes the parameters needed to identify the "tennis match" object instance on the external system 120. A button 380 enables the third-party developer or administrator to define a new profile unit. A profile unit is a customized story for the graph structure being defined. For example, a custom query may be defined to visualize interesting data based on the user actions captured on the external system 120 using a graph retrieval module 222 and a graph translation module 234 may be used to generate descriptive content for the data visualizations.

Figure 3H:
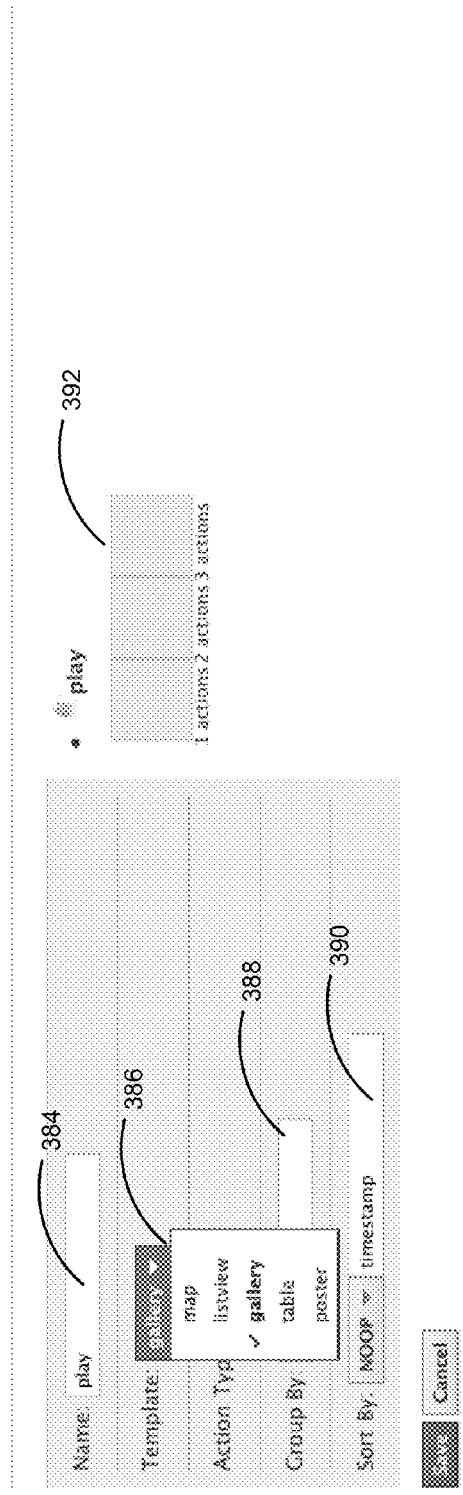

In one embodiment, a profile unit is defined by a tool illustrated in FIG. 3H. The name of the profile unit may be changed via the name text field 384. The social networking system 130 includes several templates that may be used to visualize the external user interactions captured within the profile unit. The profile unit may be displayed on a social networking system within a newsfeed as a newsfeed story or on a user's profile page. The profile unit may also be displayed on an external system outside of the social networking system via an embedded widget (e.g., iframe), in one embodiment. In another embodiment, entities external to the social networking system 130 may include a profile unit as defined by the tool illustrated in FIG. 3H in advertisements on other websites. A template drop down menu 386 provides these templates for selection, including a map, listview, gallery, table, and poster. A map may display the external user interactions as they occurred on a geographic map. A listview provides the external user interactions in a list format. A gallery provides the external user interactions with the images representing the external user interactions, as parameterized during the capture of the external user interactions. A table provides a simple table data visualization of the external user interactions. A poster provides a timeline unit, or newsfeed stream story, that displays external user interactions individually or grouped.

As shown in FIG. 3H, the captured external user interactions may be grouped by properties of the action type or object type being performed upon. These properties are specified in a text field 388. The external user interactions may be sorted by user-specified properties using the text field and drop down menu 390. A preview 392 of the profile unit being defined is also displayed. The graph retrieval module 222 enables the actions and objects generated on external systems to be analyzed and presented in a profile unit that may be configured using a developer tool application illustrated in FIG. 3H, in one embodiment. A graph translation module 234 may be utilized to provide descriptive content for the data visualizations in the profile unit.

Figures 3I, 3J:
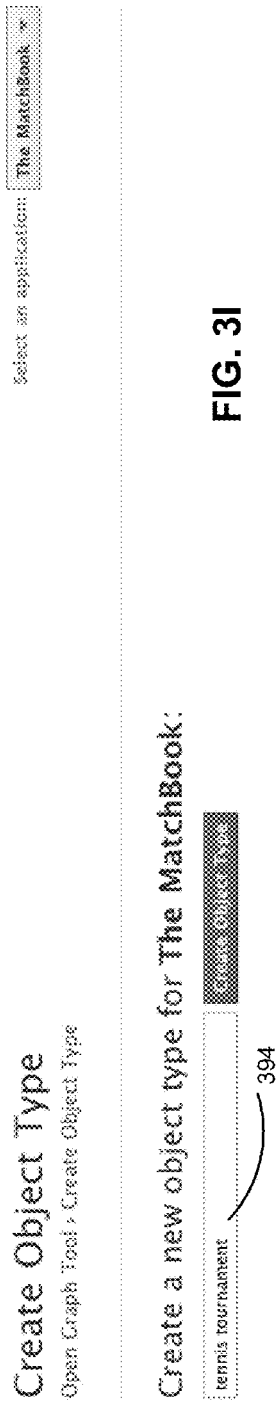

FIG. 3I illustrates how a new object type may be defined by specifying the name of the object type in a text field 394. FIG. 3J illustrates how new properties of a new object type can be specified by specifying a property name in a text field 396 and identifying the type of property in a drop down menu 398. Similar to FIG. 3F, the tool screenshot illustrated in FIG. 3J enables multiple object type properties to be added to the definition and previews are displayed that include the added object properties.

Capturing Structured External User Interactions for Publishing to a Social Networking System After a third-party developer or an administrator of a social networking system 130 has defined a structure of actions and objects for publishing to a social graph within the social networking system 130, a third-party developer may include, within a markup language document 114 that encodes a web page 122a on an external system 120 that includes the widget 124 described above in conjunction with FIG. 1A, tags that identify the structured objects and actions. User interactions on the external system generate nodes associated with the actions and objects. After the nodes are generated, actions and objects are stored in a social graph that is maintained by the social networking system 130 in one embodiment. In another embodiment, the social graph is maintained by the external system 120, but is accessible by the social networking system 130, effectively opening the social graph to third-party developers and encouraging further development and definition of a complex and rich social graph.

In one embodiment, the web page 122a comprises a markup language document 114 that includes web content and the instructions for formatting or presenting the web content. In various embodiments, the markup language document 114 comprises a data file including extensible markup language (XML) data, extensible hypertext markup language (XHTML) data or other markup language data. A markup language document comprising the web page 122b includes one or more tags that include meta-information about an object type that has been defined to capture external user actions within the web page 122a. In one embodiment, a code snippet in a scripting language is integrated into the markup language that encodes the web page 122a by the third-party developer. This code snippet includes an API call that includes parameters to create an action instance that connects a user to an object in response to an event, such as a user clicking on a button or link, in one embodiment. The social networking system 130 retrieves the tags from the markup language document 114 and uses the information extracted from the tags to publish the actions and objects into the social graph, in one embodiment. In another embodiment, the extracted information is stored in the social networking system 130. The tags allow the social networking system 130 to create and define nodes in a social graph for the actions and objects based on user interactions on the web page 122a and the external system 120. Because the web page 122a may be outside of a domain of the social networking system 130 and may be operated by an entity other than the social networking system 130 operator, the tags enable third parties to create nodes representing structured actions and objects that published into the social graph within the social networking system 130.

Information about the actions and objects that are provided by tags included in the markup language document 114 encoding the web page 122a may include, without limitation, a title, label, unique identifier, micro format, and/or descriptions about the actions and objects, as well as other information, such as the type of the nodes, one or more social networking system user identifiers specifying one or more administrators of the nodes, and/or location information associated with the nodes. A title tag identifies a text string to be shown when the social networking system 130 accesses the node. Similarly, a keyword tag includes text information identifying one or more keywords identifying the action or object and a description tag includes text describing the action or object that is displayed by the social networking system 130 when the node is presented. An image tag may identify an image displayed by the social networking system 130 or by a widget 124 when the node is presented. A uniform resource locator (URL), or other web identifier, may be used to identify a graph object described on a web page 122b on an external system 120. If a user clicks on a link to play a song on an internet radio station website, for example, the link may be an action event in an Adobe shockwave-flash (.swf) multimedia file. The third-party developer may embed identifiers of song objects, artist objects, and the like within other files, such as an Adobe shockwave-flash multimedia file. Identifiers for values of action properties, such as the duration of a running workout, may be embedded in a file, such as an Adobe shockwave-flash multimedia file. In the case of an action event in an Adobe shockwave-flash multimedia file, a third-party developer would communicate the information needed to create the objects and actions as defined by the graph definition module 132 to the widget 124 embedded in the web page 122a.

An administrator tag includes one or more social networking system 130 user identifiers specifying users of the social networking system 130 with the ability to create and/or maintain nodes associated with the actions and objects tagged on the web page 122a. The administrator tag enables specified users of the social networking system 130 to create and maintain nodes using a user interface available only to the user identifiers specified by the administrator tag. In one embodiment, an application identifier may be used in lieu of the administrator tag to identify an owner of an object. In another embodiment, a social networking system 130 may automatically detect an owner of an object based on the domain on which the object is hosted. For example, if an object is described by a web page on a website, such as http://www.example.com/SNOWMAN, where "SNOWMAN" is the object, the owner of the "SNOWMAN" object may be automatically detected as the domain "www.example.com." The social networking system may then determine metrics information about objects, such as the number of users that interacted with objects. The social networking system may also monitor the behaviors of an object based on an object owner. For example, known spammers may be blocked from creating objects. Objects created by owners that have no connections on a social networking system may be monitored to determine whether the objects are spam, viruses, or other malware.

One or more microformats attach semantics to other markup tags included in the markup language document 114, which allows information identified by the markup tags to be automatically processed by the social networking system 130. The microformats allow data describing the objects and actions to be standardized. Additionally, one or more microformats may increase the information the social networking system 130 obtains from the web page 122a to more particularly identify a node type or to associate a type with an object or an action. For example, the additional information obtained from a web page 122a using a microformat enables the social networking system 130 to recognize from the microformat what type of web page 122a is being viewed, such as an internet radio station website, e-commerce website, or news service. In one embodiment, actions and objects specific to those types of web pages may be expected by the social networking system 130 as an added check to verify user actions that are captured on external systems 120. Additionally, microformats enable the social networking system 130 to learn more about the interests of its users connected to the objects and actions associated with the web page 122a. Similarly, a location tag provides information about a location associated with the web page 122a to the social networking system 130. For example, a location tag identifies one or more addresses associated with the web page 122a.

A node type tag identifies a type of node on the social networking website 130. The social networking system 130 enables different actions to be performed on different types of nodes. Nodes may represent a user, a non-person entities, a content item, a group, an event, a message, a concept, a sports team, a blog, an activity, a web site, a movie, a musician, a hotel, a university, a government organization, a product identified by a UPC, a book, a restaurant, a company, an landmark, a bar, a location or any other thing that can be represented by an object in the social networking system 130. Node type tags enable a third-party developer to identify these nodes within the external system 120 and web pages 122a on websites hosted on the external system. For example, a node type tag for a song object may include a string such as, "<nodetype=Graph Object><OG: music: song> Moves Like Jagger</OG>" where the node tag identifies a node type to be a graph object and tags identify a link to a song titled "Moves Like Jagger."

The external system 120 generates a markup language document 114 encoding the web page 122a and serves the markup language document 114 to a user device 110 upon request. The user device 110 utilizes a browser application 112 that uses a cookie 116 that includes the user's user profile object identifier. Within the markup language document 114, a widget 124 includes instructions to perform API calls to the social networking system 130 that include information about user actions on graph objects on the web page 122a, in one embodiment. The widget 124 is not visible in the rendered web page 122a by the browser application 112, in one embodiment. In another embodiment, the widget 124 generates an action log for the user's actions on the web page 122a to record the actions and objects passively generated by the user so that the social networking system 130 may periodically retrieve the action log for publishing the actions and objects into the social graph. The information extracted from the action log or received via an API call may be stored in the social networking system 130, in one embodiment. In another embodiment, the extracted information may be used to generate newsfeed stories or content items in the stream of the social networking system 130.

Figure 4:
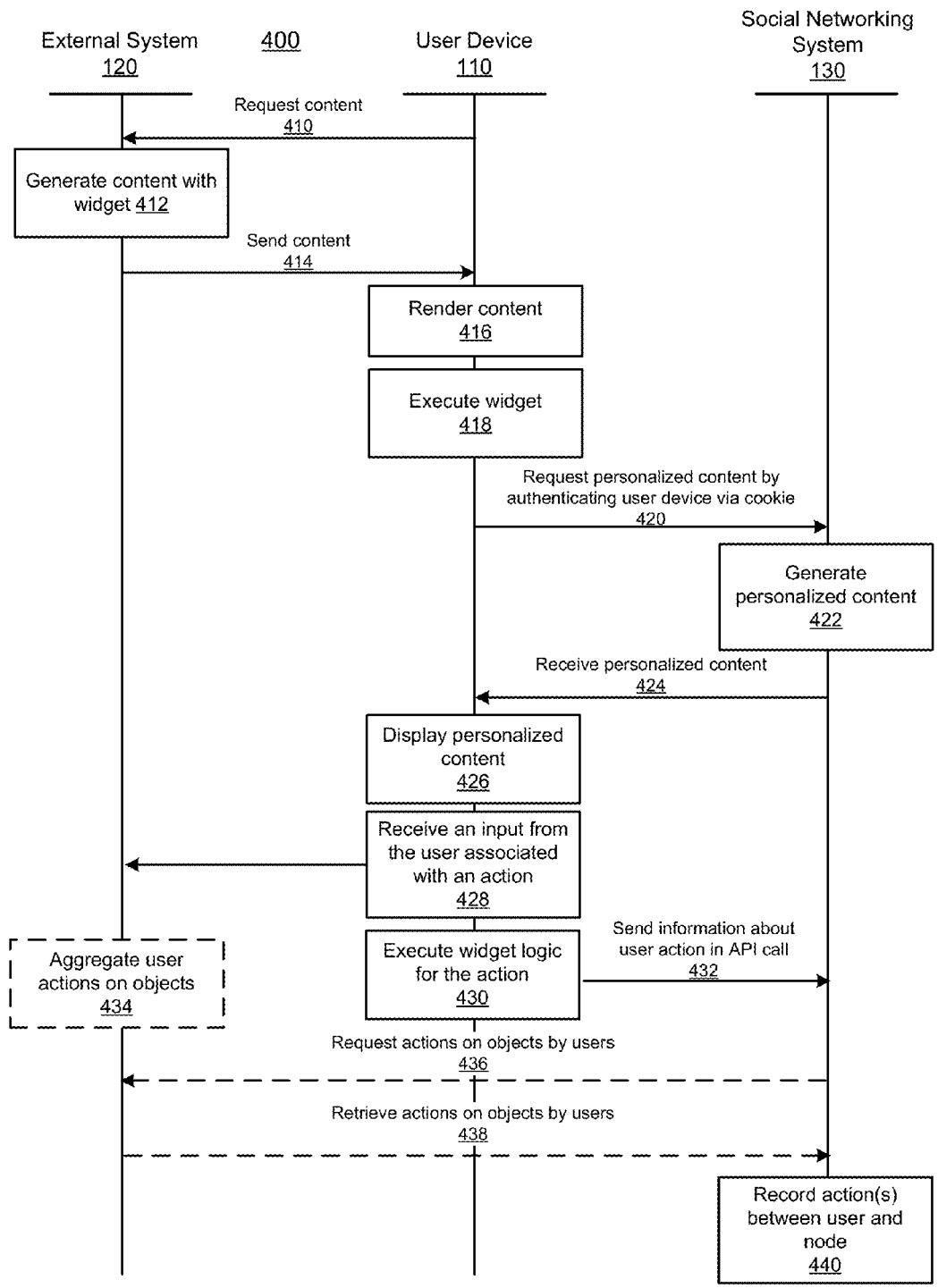
FIG. 4 is an interaction diagram of a process for structuring user actions outside of a social networking system, in accordance with an embodiment of the invention.

Once the social networking system 130 has stored types of objects and types of actions, as defined by a third-party developer or administrators of the social networking system 130, as well as relationships between the objects and actions, the graph actions and graph objects may be generated by a user of the social networking system 130 interacting with a web page 122a on an external system 120. FIG. 4 is an interaction diagram of a process for capturing structured actions and objects outside of a social networking system 130, in accordance with an embodiment of the invention. In the embodiment shown by FIG. 4, the external system 120 is separate from the social networking system 130. Initially, a user device 110 requests 410 content from the external system 120. For example, a user of the user device 110 enters a uniform resource locator (URL) or other identifier associated with the external system 120 into a browser application 112 operating on the user device 110. The browser application 112 identifies the external system 120 associated with the received URL or other identifier and requests 410 a web page 122a associated with the received URL or other identifier from the identified external system 120. As another example, a user of the user device 110 opens an application on the user device 110 that is associated with the external system 120 and a request 410 for content is sent by the application to the external system 120.

After receiving the request 410 for content, the external system 120 generates 412 the content using locally-stored data. For example, the external system 120 generates 412 a markup language document 114 describing the content and formatting of the web page 122a based on stored data. The markup language document 114 includes a widget 124 comprising instructions that, when executed by a browser application 112 of a user device 110, retrieves data from the social networking system 130 and display the information retrieved from the social networking system 130. As another example, the external system 120 may generate 412 the content in response to an API call from the user device 110.

The external system 120 then sends 414 the content to the user device. In one embodiment, the external system 120 sends 414 the markup language document 114 describing the generated web page 122a and including the widget 124 to the user device 110 through the network 140. After receiving the markup language document 114, the browser 112 renders 416 the web page 122a based on the content and formatting instructions included in the markup language document 114. In addition to rendering 416 the web page 122, the browser 112 in the user device 110 executes 418 the widget 124 to create a frame in the web page 122a. Execution of the widget 124 also causes the browser 112 to request 420 personalized content from the social networking system 130 by authenticating the user device via a cookie. The URL, or other web identifier, included in the widget 124 is communicated to the social networking system 130 to request 420 content from objects and actions associated with the URL or other web identifier. In one embodiment, the browser 112 also identifies one or more parameters from the widget 124 and transmits the identified parameters to the social networking system 130 when requesting 420 content for inclusion in the frame to allow further customization of the requested content. In another embodiment, the request 420 for personalized content is made via an API call to the social networking system 130 from the user device 110. The API call is parameterized by a third-party developer who has defined the structure of actions and objects, as described above.

Responsive to receiving the request for content from the user device 110, the social networking system 130 authenticates the user device 110 for via a cookie 116. In one embodiment, the existence of cookie 116 indicates whether the user of the computing device 110 is a user of the social networking system 130 (e.g., whether the user has a valid account with the social networking system 130). If the user of the computing device 110 is a user of the social networking system 130, the cookie 116 may contain information indicating whether the user is logged into the social networking system 130 (e.g., whether the user has a current valid session with the social networking system 130). Although cookies are described herein for authenticating the user and/or the user session, any other methods of user or session identification or authentication may be used (such as recognizing a physical token).

After authentication of the user device 110, the social networking system 130 generates 422 the requested personalized content for inclusion in the frame that is personalized according to the user associated with the received cookie 116. For example, the social networking system 130 generates 422 social information describing actions a node associated with the URL included in the widget 124 and associated with friends of the identified user. For example, the generated social information identifies a number of friends of the identified user taking a specific type of action on a type of object or identifies specific friends of a user recently taking a specified type of action on a type of object. Alternatively, the social networking system 130 generates 420 content by extracting data from the actions and objects associated with the URL included in the widget 124 without adding social information associated with the identified user. For example, the social networking system 130 determines a title, a description and an image of actions and objects that have previously been captured on the URL included in the widget 124. This content may be personalized to the user of the social networking system 130 associated with the user device 110 by sorting the actions performed by other users by affinity for interests, for example, even if the other users are not directly connected to the user.

If the social networking system 130 determines that the user associated with the received cookie 116 matches an administrator user identifier stored in the object type or action type associated with the URL included in the widget 124, the social networking system 130 generates 422 administration content for presentation by the frame. An administrator tag included in the markup language document 114 encoding a web page 122a specifies users of the social networking system 130 with the ability to create and/or maintain object types or action types associated with the web page 122a. Hence, when the social networking system 130 identifies a user associated with an administrator user identifier, the social networking system 130 generates 422 content allowing the user to modify the node associated with the URL included in the widget 124. For example, the social networking system 130 generates 422 a link that directs the user to a debug page when accessed by the user via the frame. Alternatively, the social networking system 130 generates 422 debugging information from the node associated with the URL included in the widget 124 for display using the frame. For example the social networking system 130 identifies tags missing from the markup language document 114 encoding the web page 122a and allows the user to enter the missing tags or to modify existing tags.

However, if the social networking system 130 is unable to authenticate the user associated with the received cookie 116, the social networking system 130 communicates a prompt for the user to enter authentication information to the user device 110. Alternatively, the social networking system 130 generates 422 content by extracting data from the node associated with the URL included in the widget 124 without personalizing the content towards a user. In another embodiment, the social networking system 130 generates 422 content by extracting data from the node associated with the URL included in the widget 124 and determining actions taken by any user of the social networking system 130 regarding the identified node. For example, the social networking system 130 may identify the most recent user interactions regarding the identified action types and object types performed by any user of the social networking system 130. Thus, until the social networking system 130 receives authentication information associated with the user associated with the received cookie 116, the content generated 422 by the social networking system 130 does not include social information describing actions performed by friends of the user associated with the received cookie 116 regarding the identified node.

The user device 110 receives 424 the personalized content from the social networking system 130 through the network 140. The user device 110 then displays 426 the personalized content received 424 from the social networking system 130. A user device 110 then receives 428 an input from the user associated with the action. The user device 110 may receive an explicit indication from the user that the user performed the action, such as an application running on the user device 110 that enables the user, via a prompt or other user interface, to indicate that the user "ran 10 miles" or "read 'Tales of the City" using the user device 110. In another embodiment, the user device 110 may observe the action being performed by the user, such as the user loading a specific web page, opening an electronic book reader application and loading a book, or opening a music application and loading a song. The action is defined by the third-party developer or administrator of the social networking system 130, such as listening to a song, reading a book, lifting weights, or playing a tennis match. The input from the user associated with the action may be received by a click of a mouse, touch command, or voice command on a browser application, in one embodiment. In another embodiment, the user input associated with the action may be received 428 by submitting an HTTP request to load a specified URL of a web page. In yet another embodiment, the user input associated with an action may be received 428 by a user device 110 retrieving its GPS location via an application running on the user device 110. In a further embodiment, the user input associated with an action may be received 428 by a user device 110 communicating with an external system to perform an action on the user device 110, such as playing the next song on an internet radio station or achieving a new high score on a tennis match. The third-party developer or operator running the external system 120, as described above, implemented a code snippet in the widget 124 to identify the action received 428 by the user device 110. In this way, the user of the user device 110 may passively create actions that are received 428 by the user device 110, once the user device 110 has been authenticated by the social networking system 130.

The user device 110, having received 428 an action, executes 430 the widget logic for the action, or the instructions included in the widget. In one embodiment, an instruction in the widget logic causes the browser application 112 executing the widget 124 to record the action according to the defined structure of action types and object types associated with the URL identified by the widget 124. The widget may also include an instruction to send 432 information about the user action in an API call to the social networking system 130. Such information may include the performed action type, the object type, and the user identifier for the user as well as contextual information regarding the performed action, such as number of miles ran, number of calories burned, location of the workout, other applications running at the same time, such as a music application, and the like. The social networking system 130 records 440 the action between user and the action type node. As with any user interaction with a node in the social networking system 130, this interaction may create an edge between the user and the action type that the user interacted with. The stored edge provides useful information about the connection between that action type node and the user (where the user is also represented by a node). This edge information may be stored in an object store in the social networking system 130, for example, in the user profile object associated with the user or as a separate connection object in a connection store 214.

Because actions received 428 may occur on any communication with the external system 120, the user actions may be aggregated 434 by the external system 120 instead of being reported individually by the user device 110. Periodically, these aggregated actions may be requested 436 by the social networking system 130 and retrieved 438 by the social networking system 130 so that the actions can be recorded 440 in the social networking system 130. In such an embodiment, the social networking system 130 may provide APIs for the external system 120 to make the aggregated actions available to be retrieved 438 upon request 436. Alternatively, any other appropriate mechanisms for communicating this information from the external system 120 to the social networking system 130 may be used.

Accordingly, the social graph maintained by the social networking system 130 may include actions and objects that can be generated on any external system. In addition to increasing the amount of data stored by the social graph, the opening of the social graph to third-party developers enables users of the social networking system 130 to easily integrate, share, and discover real-world interactions with external systems into the social networking user experience, such as playing music playlists of tracks from different external systems, engaging in conversations about a new artist's album with connections on the social networking system, passively sharing information about listening preferences to users of the social networking system via recommendations and reviews, and a limitless number of combinations of other interactions with concepts embodied in external systems 120.

Figure 5A:
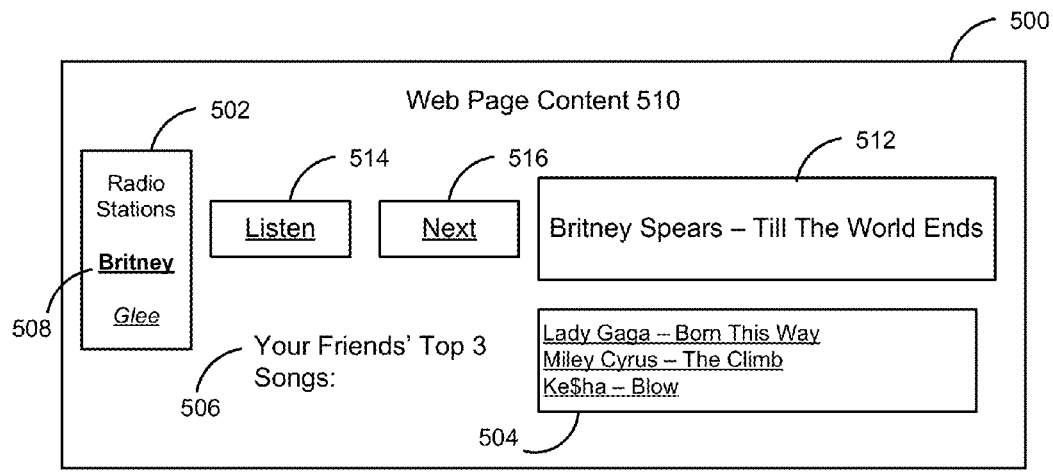
FIGS. 5A-D illustrate examples of a web page of an external system that includes a widget for structuring user actions outside of the social networking system, in accordance with an embodiment of the invention.
Figure 5B:
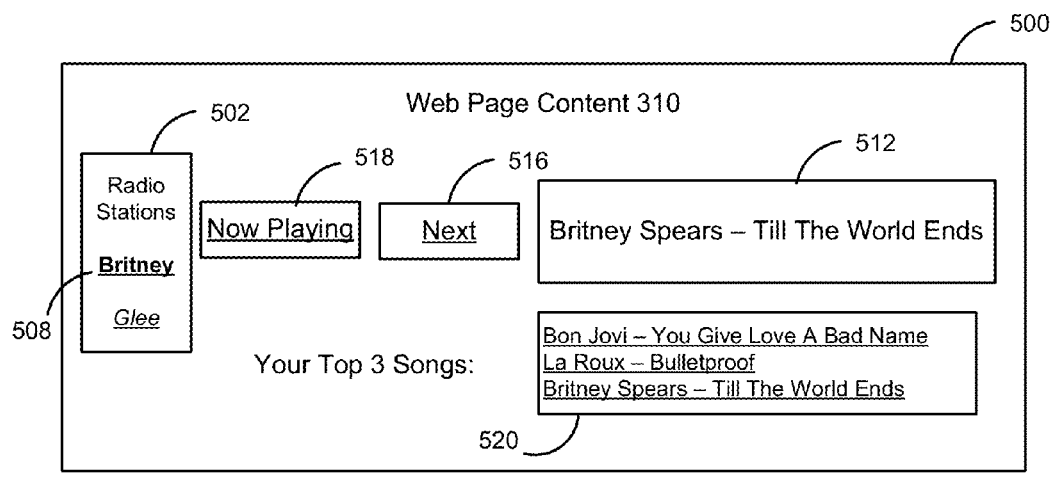
Figure 5C:
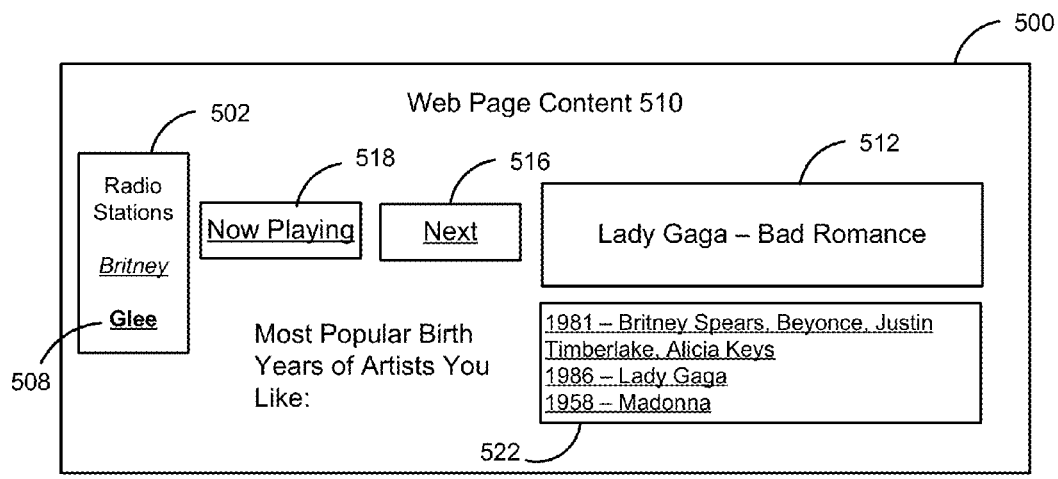

FIGS. 5A-C illustrate one embodiment of a web page 122a of an external system 120. The web page 122a includes a frame 504 for displaying results of queries of social graph data that has been published from the external system 120 based on other users of the social networking system 130 connected to the user viewing the web page 122a. The web page 122a includes content 510 such as text data, video data, image data or any other data for presentation using a browser application 112 operating on a user device 110. The web page 122a also includes one or more instructions describing formatting or presentation of the content 510. When a browser application 112 operating on a user device 110 executes the instructions included in the web page 122, the browser application 112 displays the identified content 510 using the format or presentation described by the web page 122a.

The web page 122a also includes a frame 504 that calls a Uniform Resource Locator (URL) within a domain associated with the social networking system 130. The frame 504 is rendered by a browser application 112 operating on a user device 110 executing a widget 124 included in the markup language document 114 encoding the web page 122a. The widget 124 comprising one or more instructions that, when executed by a browser application 112, generate the frame 504 within the web page 122a and include information from the social networking system in the frame 504. In one embodiment, the frame 504 is an iFrame including data obtained from the social networking system 130. The iFrame may also be described as a plug-in that incorporates socially relevant information into the web page 122a on the external system 120. Socially relevant information may be defined as information about connections or other users of the social networking system 130 that may be perceived as relevant to the viewing user based on information known about the viewing user. In one embodiment, the viewing user's interests and preferences may be obtained from the user profile object associated with the viewing user and obtained from the social networking system 130. In another embodiment, the viewing user's identity on the social networking system 130 may be unknown. In that case, information about the content being generated on the web page 122a may be utilized to populate the frame 504 with socially relevant information related to the content. The plug-in may include graph actions and graph objects that have been generated by users of the social networking system on the external system 120 that is being viewed.

The frame 504 includes data from the social networking system 130 associated with a node maintained by the social networking system 130 and associated with a URL, or other web identifier, specified by the widget 124. For example, when a browser application 112 executes the widget 124, a request for content including a song object identifier, radio station object identifier, and/or user profile identifier is communicated from the browser application 112 to the social networking system 130. The social networking system 130 identifies a song object 304 and/or radio station object 302 from the request for content and communicates socially relevant information about the identified song object 304 and/or radio station object 302 to browser application 112 based on the connections of the user profile object 318. The browser application 112 displays this socially relevant information in the frame 504. In one embodiment, the widget 124 communicates one or more parameters to the social networking system 130. The parameters allow the web page 124 to customize the frame 504. For example, the parameters specify the height and/or width of the frame 504.

In one embodiment, the widget 124 includes instructions in a scripting language to make an API call upon completion of certain events, such as clicking on certain links to URLs or other web identifiers. For example, FIG. 5A illustrates a portion 500 of a web page 122a that includes a widget 124. The widget 124 includes a radio station menu 502, a listen button 514, a next button 516, a now-playing ribbon 512, and a frame 504. Selection of the listen button 514 enables a user to play music on the internet radio station website. Upon this event, clicking the listen button 514, the widget 124 records a listen action 310 by the user profile object 318 associated with the user. Additionally, a radio station object 302 and song object 304 are recorded and associated with the listen action 310. The widget 124 may, in one embodiment, record actions and objects in an action log to be communicated to the social networking system 130. In another embodiment, the widget 124 communicates a message to the social networking system 130 including the radio station object 302, song object 304, listen action 310, and user profile object 318 in an API call. This API call to the social networking system 130 enables the creation of nodes on the social graph, providing content for news stories and content items to be published in the stream of the social networking system 130 to be displayed to connections of the user.

As another example, a mobile application, external to the social networking system 130, may operate to listen to a song that is playing at a club, at the request of the user. Assuming that the user of the mobile application had given permissions to the mobile application to share information with the social networking system 130, a song object 304 corresponding to the identified song playing in the club may be recorded by a widget 124 as well as the listen action 310. A location object 312 may also be recorded by the widget 124 based on GPS location services on the user's mobile device. The mobile application may incorporate the widget 124 to record and report objects and actions performed by users of the social networking system 130. As a result, the user's user profile object 318 may be updated to reflect an interest in the music genre of the genre object(s) 316 associated with the song object 304. Further, the user may be checked-in to the place indicated by the location object 312. Thus, the widget 124, either incorporated into an application or a web page, enables a user of a social networking system 130 to passively publish one or more interactions with an external system 120 to the social graph.

The frame 504 may also include socially relevant information 506 obtained from the social networking system 130, such as "Your Friends' Top 3 Songs." This enables the content in frame 504 to be personalized for an identified user of the social networking system 130. The socially relevant information 506 may be personalized to friends of an identified user or may be information obtained from all users if a user of the social networking system 130 cannot be identified. Additionally, socially relevant information 506 may be retrieved using queries on structured actions and objects related to an object identifier corresponding to the object that is currently being viewed. In this case, the now-playing ribbon 512 is currently playing the song "Till The World Ends" by the artist "Britney Spears."

FIGS. 5A-C illustrate example web pages of an external system 120 for an internet radio station. A user of the social networking system 130 has already provided permissions to the external system 120 to share information with the social networking system 130. The user has made a selection 508 on the radio station menu 502 to listen to the "Britney" radio station on the external system 120. The song "Till the World Ends" by the artist "Britney Spears" is currently playing in the now-playing ribbon 512. When the user clicks on the "Listen" button 514, the widget 124 embedded in the web page 122a makes an API call to the social networking system 130 with the user's user profile object identifier and a song object identifier, in one embodiment. In another embodiment, the widget 124 records the listen action and the song object in an action log that is periodically retrieved by the social networking system 130. In a further embodiment, the widget 124 records identifying information about the listen action instance and the song object instance in an activity log on the social networking system 130. In one embodiment, the song object identifier for a song is the name of the song and the name of the artist. In another embodiment, an alphanumeric identifier is assigned to songs by a third-party developer or administrator of the social networking system. In a further embodiment, the identifier of the song object is the URL for the web page 122b that describes the song object on the external system 120.

If a user clicks on the "Next" button 516, a third-party developer may interpret that as the user being not interested in the song that was playing. As a result, another API call may be made to the social networking system 130 with the user's user profile object identifier and song object identifier that indicates that the song was skipped by the user. This "skip" action may be interpreted by applications utilizing this information to modify a user's user profile information to indicate that the user is not interested in the song, the artist performing the song, and even the genres of music associated with the song. An analysis of graph actions on graph objects may be performed because the song object is structured as defined by a third-party developer or administrator of the social networking system 130, such as the structure described in FIG. 3 in which a song object 304 is linked to an artist object 306, and both song and artist objects are linked to genre objects 316. Interpretations of graph actions and graph objects may be generated by various modules of the social networking system 130 and/or external systems 120.

FIG. 5A also illustrates how the widget 124 may provide socially relevant information 506 to the user regarding the song that is currently playing. This is a result of queries made on the actions and objects generated by embodiments of the invention. In FIG. 5A, "Your Friends' Top 3 Songs" indicates the top 3 songs played by the user's connections on the social networking system 130. A third-party developer may also utilize custom queries, in addition to template queries such as the most frequently played songs that may be developed by administrators of the social networking system 130. For example, in FIG. 5B, the widget 124 provides a frame 520 for display to the user of the user's own top 3 songs. The query that retrieved these results may exclude the songs that the user skipped in addition to the songs that the user listened to the most. More intricate and complex queries may be generated to provide more interesting data visualizations, as shown in FIG. 5C illustrating a frame 522 that displays the most popular birth years of artists that the user likes. This query takes the songs most listened to by the user, then grouped by birth year of the artist. Although not illustrated, this query can also be performed on a user's connections in the social networking system 130, or across all users of the social networking system 130. Again, these queries are made possible by the structure of the song object as defined by third-party developers or administrators of the social networking system 130, as illustrated above in FIG. 3.

FIG. 5C illustrates another radio station, the "Glee" station, being played by the user of the social networking system 130. The selection 508 of the "Glee" radio station may also trigger an API call to the social networking system 130 by the widget 124 that passes along the radio station object identifier 302 for "Glee" and the user's user profile object identifier as parameters in the API call, in one embodiment. In another embodiment, an action log may be populated with the same information and periodically retrieved by the social networking system 130. A "switch" action, in addition to the "listen" action described in FIG. 3, may be recorded in the action log, for example.

As illustrated in FIGS. 5A-C, multiple actions and objects may be generated and published to the social graph of a social networking system 130 based on user actions on an external system 120, specifically a web page 122a. In particular, a widget 124 embedded in the web page 122a may be programmed by the third-party developer to make API calls to the social networking system 130 upon user events such as clicking on various buttons, menus, and links, in one embodiment. In another embodiment, the widget 124 may generate an action log for the user performing those events and record the objects and actions in the action log for the social networking system 130 to periodically retrieve.

Figure 5D:
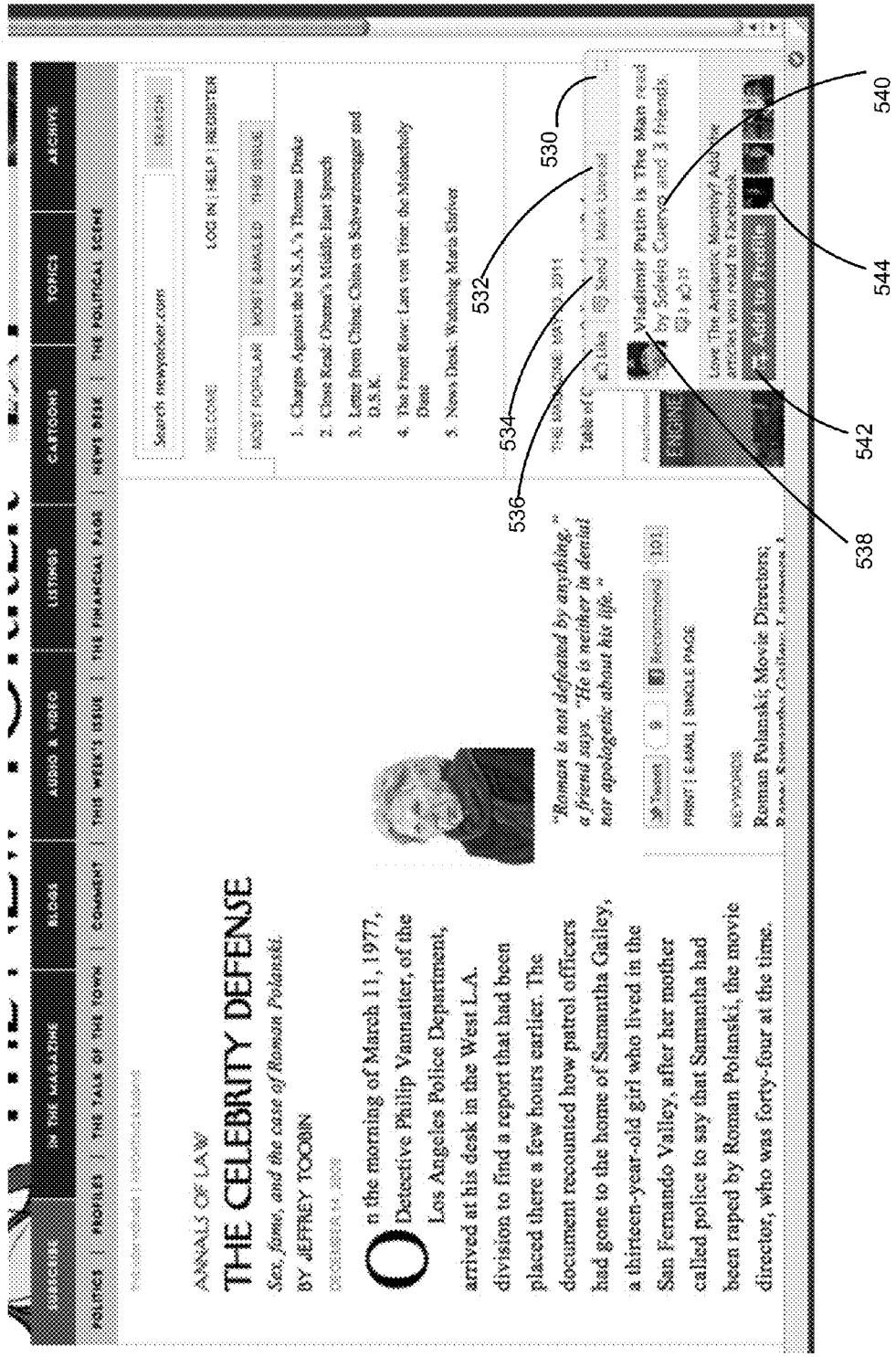

FIG. 5D illustrates an example of a widget 124 being executed on a web page 122a of an external system 120, in accordance with an embodiment of the invention. In one embodiment, the widget 124 includes an instruction to generate an API call to the social networking system 130 to retrieve socially relevant information 538 to recommend to a viewing user. FIG. 5D illustrates a news article website hosted on an external system 120 in which a widget 124 renders a plug-in 530 that incorporates the socially relevant information 538, "Vladimir Putin is The Man read by Soleio Cuervo and 3 friends," obtained from the social networking system 130. As shown in FIG. 5D, the news article "Vladimir Putin is The Man" is a graph object and "read" is a graph action. "Soleio Cuervo" and "3 friends" are the actors 540, or users of the social networking system 130, who have performed the graph action on the graph object. Images 544 may be retrieved from the social networking system 130 as a result of an API call that correspond to the actors 540 and may also be displayed in the plug-in 530.

Graph actions may be incorporated into a custom execution button 532, such as a button that enables marking the news article as "unread." The custom execution button 532 may incorporate various programming instructions depending on the type of graph action involved. In this instance, the custom execution button 532 generates a separate action, the "unread" action, reversing the "read" action as a user loads the web page 122a. A "read" action may be passively generated as a user spends a predetermined amount of time on the web page 122, in one embodiment, or scrolls down to the end of the web page 122, in another embodiment. Other actions, such as sharing a node with connections on the social networking system and expressing approval of a node, may also be incorporated into a send button 534 and a like button 536 in the plug-in 530. The plug-in 530 also includes within the socially relevant information 538 a number of comments and expressions of approval by users of the social networking system 130. Finally, an authorization button 542 may be provided for display in the plug-in 530 to enable authorization for passive publishing to the social networking system 130 of graph content items generated on the external system 120 on a continuing basis. For example, a user that visits a web page 122*a* of a website hosted on an external system 120 may be prompted in the plug-in 530 to add the website to the profile page associated with the user. In doing so, the user grants permission to the social networking system 130 to passively publish content items into the stream as the user continues to interact with the website. This beneficially generates additional graph content items for users of the social networking system 130 to discover and share while also capturing real-world interactions on external systems 120.

In another embodiment, a third-party developer may include a widget 124 on a web page 122*a* on an external system 120 that includes a social context for the content on the web page 122*a*. Multiple actions may be performed on a graph object embodied on a web page 122*a*, such as "recommend," "share," "like," "read," "comment," "download," and so on. In FIG. 5D, an article is being "read" by a viewing user. The images 544 that are included in the widget 124 may include other users that have performed the "read" action on the news article object. On the other hand, a different action may be determined to be the "best" action for the graph object, such as the "recommend" action, because more users connected to the viewing user have performed that action on the graph object. As such, the images 544 may depict other users that have performed the "best" action, the "recommend" action. In a further embodiment, the widget 124 may use information about the viewing user, such as the viewing user's interests, affinities, and past clicking behavior, to determine the "best" action to display. For example, a "comment" action may be the "best" action for the graph object displayed in FIG. 5D because the viewing user has commented frequently on other articles. Thus, the images 544 displayed to the viewing user may include other users that have commented on the news article. In one embodiment, a third-party developer may include a social context for the content of the web page 122*a* and broaden the visualization of other user interactions related the graph object embodied in the web page 122*a* to also include users that have interest in other objects related to the graph object embodied in the web page 122*a*. For example, instead of merely showing users in the widget 124 that have interacted with an article entitled "The Celebrity Defense," an article about "Roman Polanski" as depicted on FIG. 5D, the widget 124 may show users connected to the viewing user that have an interest in "Roman Polanski," a page object in the social networking system, users that have interacted with a graph object for a movie review of a film directed by Roman Polanski, as well as users that have commented on another news article about Roman Polanski. In this example, the widget 124 includes users of the social networking system that have interacted with other objects, including graph objects, that have metadata associated with them, such as the movie director graph object "Roman Polanski," because the graph object embodied in the web page 122*a* includes the keywords "Roman Polanski." In other embodiments, a third-party developer may include custom queries in the widget 124 to search for other users connected to the viewing user that have watched a movie directed by Roman Polanski and that are interested in legal articles. These custom queries may be performed because custom graph objects may include object properties that are searchable.

Ranking Graph Content Items for Publishing on a Social Networking System

Figure 6:
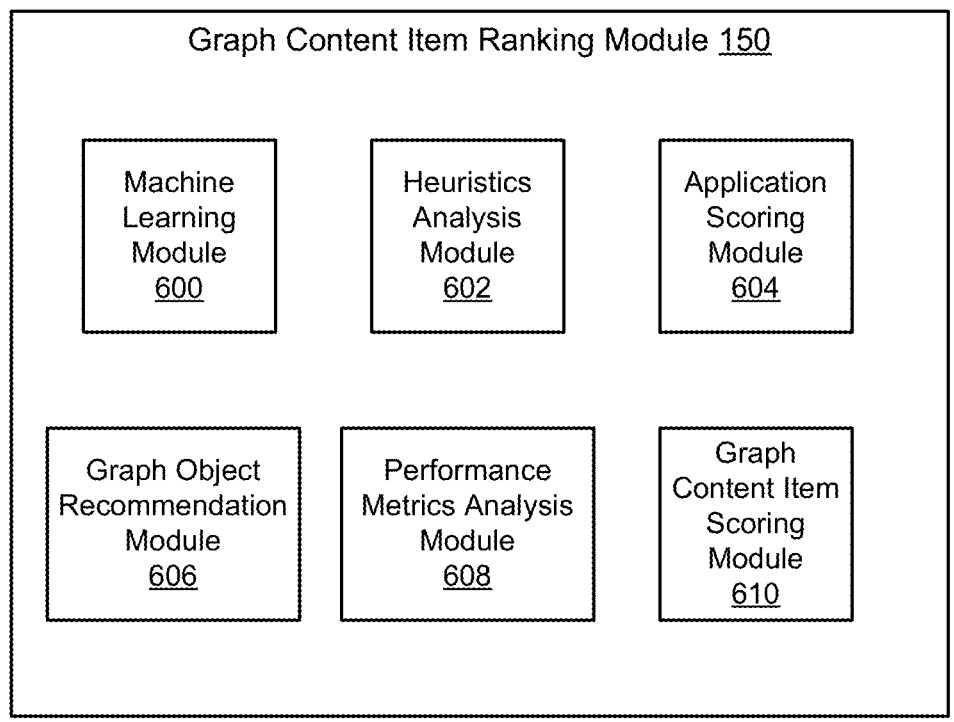
FIG. 6 illustrates a high-level block diagram of a graph content item ranking module, in accordance with an embodiment of the invention.

FIG. 6 illustrates a high-level block diagram of a graph content item ranking module, in accordance with an embodiment of the invention. The graph content item ranking module 150 includes a machine learning module 600, a heuristics analysis module 602, an application scoring module 604, a graph object recommendation module 606, a performance metrics analysis module 608, and a graph content item scoring module 610. These modules may perform in conjunction with each other or independently to develop a ranking score for content items assembled from graph data generated on external systems 120 that is communicated to the social networking system 130.

A machine learning module 600 optimizes the ranking of graph content items on a social networking system 130. Utilizing a training model with initial weights, the machine learning module 600 may be used in conjunction with the performance metrics analysis module 608 to determine how to best optimize the ranking to present more relevant content items. For example, a content item that is marked as spam or hidden by a viewing user may be interpreted by the machine learning module 600 as training information to adjust the initial weights used by the machine learning module 600 in the ranking of graph content items. The machine learning module 600 may be used in conjunction with other modules to explicitly include or exclude content items for display on the social networking system 130 for particular viewing users, in one embodiment.

A heuristics analysis module 602 operates independently and asynchronously from the other modules in the graph content item ranking module 150. The heuristics analysis module 602 performs various steps to analyze information gathered by the social networking system 130 about objects and actions generated on external systems 120. In one embodiment, the heuristics analysis module 602 may be used to analyze the level of communications activity regarding particular interests embodied in objects that are generated via external user interactions and determine whether those communications include relevant keywords in ranking content items generated from those external user interactions. For example, a comment on a content item posted on the social networking system 130 that reads "The new Lady Gaga single is way better than Britney's" may be analyzed by a heuristics analysis module 602 to infer a greater interest in "Lady Gaga" over "Britney" and, as a result, may assign a higher affinity score to "Lady Gaga" in the commenting author's user profile object. As another example, object-to-object similarity analysis may be performed by the heuristics analysis module 602 to identify similar objects to the objects that a viewing user has engaged with or has expressed an interest in. The similarity analysis may then be utilized by a graph object recommendation module 606. As user interactions on external systems 120 generate graph objects and graph actions, the assembled graph content items are ranked by utilizing information from the heuristics analysis module 602.

An application scoring module 604 scores applications for quality based on the graph data 142 received from external systems 120. Applications may be assigned reputation scores by other modules of the social networking system 130 based on various factors, including the number of users of the application, the age of the application, who the developers are, number of times the application has been reported, the number of stream stories that have been published or marked as spam, whether the application has been disabled by the social networking system, and the like. These factors may be analyzed by the application scoring module 604 to generate an application quality score to be used by the graph content item ranking module 150 in ranking content items for display. Additional factors that may be utilized to generate the application quality score include the number of impressions, clicks, comments, and other interactions with content items provided for display to viewing users of the social networking system 130. The information received about applications may include historical values based on the past few hours, day, week, and month. The application quality score for an application may be optimized over time based on positive and negative feedback received about the application in conjunction with the machine learning module 600 and performance metrics analysis module 608, in one embodiment.

A graph object recommendation module 606 provides a recommendation engine that highlights objects that may be of interest to a viewing user based on past interactions with other objects, interests of the viewing user, and the past interactions with other objects by other users connected to the viewing user. In one embodiment, a recommendation score is determined from the dot product of a user vector for the viewing user and a user-independent story vector referencing an object. The viewing user may have preferences for certain categories of object types, such as music videos, social commentary links, news articles, political campaigns, and social causes. These viewing preferences may be stored as a user vector with values corresponding to an affinity for that category of object. Similarly, metadata about objects may be analyzed and stored in a user-independent story vector with membership values for each of the categories in the user vector. It can be appreciated by one having skill in the art that the information in user vectors and user-independent story vectors may be stored in a variety of data structures, such as arrays, matrices, and databases. Here, the term "vector" is used for purposes of illustration only. For example, if three (3) users connected to a viewing user listened to ninety-nine (99) of the same songs as the viewing user, and those 3 users also listened to a one-hundredth ($100^{th}$) song, then the $100^{th}$ song may be selected by the recommendation engine as a song object that may be relevant to the viewing user. The recommendation engine uses user vectors and user-independent story vectors to compute recommendation scores for potential objects that may be recommended to a viewing user.

Object metadata, such as properties of graph objects as defined in its structure, may be utilized to generate categories of graph objects. For example, a music video by Lady Gaga with social commentary may have a value of 1 for the music video parameter and the social causes parameter in the story vector. The story vector may be generated by the social networking system, in one embodiment. In another embodiment, the story vector may be generated by the external system that generated the object and action. As a result of the dot product of the user vector and the user-independent story vector, a recommendation score for the content item is generated based on the viewing user's preferences and information about the objects referenced in the content item (story). Values for story vectors may be generated automatically, in one embodiment, using known categories, such as music video file formats, web domains specializing in social causes, and the like. As a result, user-specific scores for a viewing user may be generated for graph objects by analyzing behavior patterns of other users on the social networking system. This enables the social networking system to predict whether the viewing user may be interested in the graph objects.

Object-to-object similarity analysis may also be determined by the graph object recommendation module 606 asynchronously. Graph objects may be analyzed based on their object properties to determine whether the graph objects are sufficiently similar. For example, a gaming application may include an object property of "strategy game." Other gaming applications that include the same object property of "strategy game" may be considered similar. In another example, song objects having the same genre object property of "Country" may be considered similar by the graph object recommendation module 606. Continuing the example above, a music video by Katy Perry that also includes social commentary may be determined to be similar enough to the Lady Gaga music video that includes social commentary to be recommended for display to a viewing user that does not have an expressed interest in Katy Perry. A similarity scoring model may be generated for scoring the similarity of graph objects. As a result, a predetermined similarity threshold may be used by the graph object recommendation module 606 to determine whether an object may be recommended to a viewing user based on similarity to other graph objects that the viewing user interacted with. In one embodiment, user behaviors may be analyzed to determine whether graph objects are similar. The graph object recommendation module 606 may work in conjunction with the heuristics analysis module 602 to analyze an application's behavior in terms of prior spamming behavior to determine whether an object may be deemed similar to another object. Object metadata may also be indexed by the graph object recommendation module 606 for filtering purposes.

Additionally, the graph object recommendation module 606 may track the object types that have been displayed to a user and recommend object types that have not been recently displayed, in one embodiment. This information may be tracked and maintained in the user profile object associated with the user. This benefits the user because a variety of content items with diverse object types is likely to engage the user more and, in return, provide a better user experience on the social networking system 130 while also providing more advertising opportunities to advertisers.

Objects and/or content items that have been recommended by the graph object recommendation module 606 may influence a ranking score generated by the graph content item ranking module 150 in varying intensities, such as by increasing a ranking score exponentially, linearly or logarithmically. For example, the recommendation score described above, as determined by the dot product of the user vector and the user-independent story vector, may strongly influence the ranking score and, as a result, may exponentially increase the ranking score. As another example, the object-to-object similarity analysis may be less influential on the ranking score due to the uncertainty of the viewing user's preferences. The machine learning module 600 and heuristics analysis module 602 may work in conjunction with the graph object recommendation module 606 and performance metrics analysis module 608 to refine and adjust how much influence the recommendation score may have on the overall ranking score of a content item.

A performance metrics analysis module 608 tracks conversion rates and click-through rates (CTRs) of content items that have been ranked and displayed to a viewing user to provide feedback regarding ranking scores generated by the graph content item ranking module 150. In particular, the machine learning module 600 utilizes information gathered by the performance metrics analysis module 608 to adjust and optimize various parameters, including affinities in user profile objects, parameters in user vectors and user-independent story vectors for use in determining a recommendation score, and application quality scores for determining the quality of applications on the social networking system 130 that enable objects and actions to be generated on external systems 120. Other performance metrics, in addition to the click through rate (CTR) of content items, are gathered by the performance metrics analysis module 608 and analyzed for user in optimizing the ranking score model, such as a "mark as spam" rate that tracks the rate of how frequently content items are marked as spam by viewing users, a "report as abuse" rate which similarly tracks the rate of how frequently an application is reported as abuse, and the numbers of comments and "likes" on content items. These performance metrics, which include both negative and positive feedback from users, provide valuable insight into whether external systems 120 are spamming users or providing socially relevant information.

In one embodiment, a user may select a content item to be highlighted on the user's profile page on the social networking system 130. This selection may also be referred to as "pinning" the content item onto the profile page. Content items appearing on user profile pages may also be referred to herein as "timeline units," and various timeline units may be "pinned" automatically by the social networking system using the graph content item ranking module 150. To select the content items to be pinned as timeline units, various information and factors are utilized by the graph content item ranking module 150 to highlight specific content items that were highly commented on, shared, tagged, and engaged with by users of the social networking system 130. In this embodiment, the performance metrics analysis module 608 may also gather additional performance metrics to provide additional factors to the graph content item ranking module 150 in automatically generating timeline units on profile pages for users, including a number of pinned timeline units by users, a number of timeline units hidden explicitly by users, and engagement metrics with pinned timeline units (including click-through rates, conversion rates, commenting, sharing, liking, and tagging). These performance metrics are used to surface the most relevant content items, including graph content items, to be automatically pinned to users' profile pages, in one embodiment.

A graph content item scoring module 610 generates a ranking score for candidate content items that may potentially be displayed to a viewing user. The ranking score model includes global factors, user-specific factors, and recommendation scores. The ranking score model, in one embodiment, is a linear weighted function in which each factor is a weight. In another embodiment, the ranking score model is an exponential function with coefficients and exponents for each factor that may be optimized using the machine learning module 600. In yet another embodiment, the ranking score model includes a logarithmic function. For example, a user with a high number of connections on the social networking system may have published a graph content item with a high number of impressions and comments from other users. Though the popularity of the graph content item may be a good factor to influence its ranking score, the popularity of the graph content item may be skewed or disproportionate to its true popularity due to the high number of connections of the user generating the content item. A logarithmic function may be more appropriate than a linear function or an exponential function in this example in order to account for the high number of connections. Additionally, some users may "overshare," or publish content items to the social networking system frequently. In one embodiment, a logarithmic function may be utilized to limit recommended content items from these oversharing users.

Thus, the graph content item ranking module 150 may be utilized to rank content items assembled from graph objects and graph actions on external systems, such as listening to songs, watching movies, playing board games, and completing workouts. The ranking module 150 may be utilized by other modules on the social networking system 130 to generate recommendations for songs, movies, games, and other concepts based on patterns of behavior that may be analyzed and observed because of the structured graph objects and graph actions defined on the social networking system 130. Further, external interactions may be seamlessly integrated into the social networking system 130 to provide a more beneficial user experience for users, personalizing a real world activity, such as listening to music, for each user.

Social Music Application Example on a Social Networking System

Figure 7:
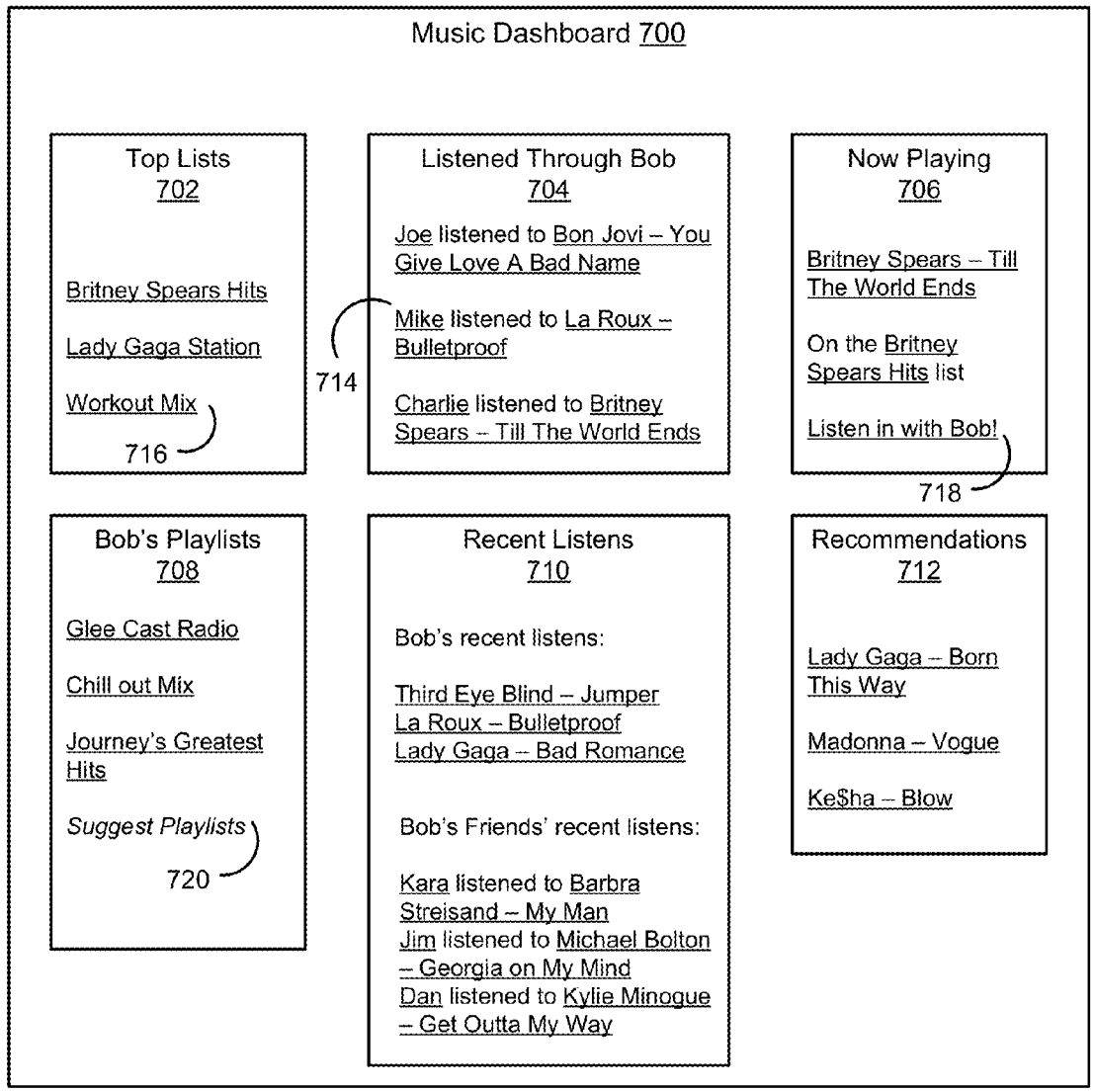
FIG. 7 illustrates an example of a user interface on a social networking system integrating graph objects and graph actions into the social networking system, in accordance with an embodiment of the invention.

FIG. 7 illustrates an example of a user interface on a social networking system that integrates graph objects and graph actions into the social networking system, in accordance with an embodiment of the invention. In one embodiment, graph objects and graph actions are defined as song objects, artist objects, listen actions, and other objects as defined in FIG. 3A. A music dashboard 700 is a user interface on a social networking system 130 that enables users to interact with graph actions and graph objects that are hosted on external systems 120. A music dashboard 700 includes several modules, including a top lists module 700, a music tracking module 704, a now playing module 706, a playlists module 708, a listen history module 710, and a recommendations module 712. The music dashboard 700 may appear as a tab on a user profile page on a social networking system 130, in one embodiment. In another embodiment, the music dashboard 700 may appear on a mobile application running on a native operating system on a mobile device. In yet another embodiment, the music dashboard 700 may be embedded on a website hosted by an external system 120.

A top lists module 700 displays the top lists of songs generated by users of the social networking system 130, in one embodiment. The top lists of songs may be generated by user-specified queries on global information available on the social networking system 130, in one embodiment. In another embodiment, the top lists module 700 displays the top lists of songs generated by users connected to the viewing user. In yet another embodiment, the top lists module 700 displays the most listened to lists in a predefined time period, such as the last month, last week, last day, and last hour. FIG. 7 illustrates the top lists module 700 displaying three selectable links: "Britney Spears Hits," "Lady Gaga Station," and "Workout Mix." When selected, a link triggers a request to the external system 120 serving the music to play the list associated with the link, in one embodiment. In another embodiment, selecting the link causes a separate page to open on the social networking system 130 associated with the list. The lists are represented by list objects that have been defined as graph objects that may be commented on, shared, liked, and tagged. The lists may be created by users of the social networking system 130 in one embodiment, such as the "Workout Mix" list 716, or by third-party developers in another embodiment.

A music tracking module 704 displays songs that were discovered by other users as a result of the user listening to the song. The graph integration module 160 tracks conversions and clicks by users on graph content items displayed on the social networking system 130. FIG. 7 illustrates an example of the music tracking module 704 that displays three content items: "Joe listened to Bon Jovi—You Give Love A Bad Name," "Mike listened to La Roux—Bulletproof," and "Charlie listened to Britney Spears—Till The World Ends." In one embodiment, the music tracking module 704 enables a viewing user to select a song to start playing the selected song from an external system 120 via the social networking system 130. Selecting a link 714 associated with a tracked user in the music tracking module 704 may direct the viewing user to the user profile page for the tracked user, in one embodiment. In another embodiment, selection of the link 714 associated with the tracked user directs the viewing user to a page in the social networking system 130 that includes the songs listened to by the tracked user via the user associated with the music dashboard 700.

Similarly, a now playing module 706 displays a song that is currently playing and the list that is being listened to by the user. The viewing user may select to listen to the song being played ("Britney Spears—Till The World Ends"), the list being played ("Britney Spears Hits"), or the viewing user may select to collaboratively listen with the user associated with the music dashboard 700 by selecting the link 718, "Listen in with Bob!" By selecting the link 718, the viewing user will listen to whatever Bob is listening to in real-time. This enables users to collaboratively listen to streaming music on an external system via the social networking system 130. Collaboratively listening action links 718 may be included in other applications and interfaces on the social networking system 130, such as a messaging application, chat interface, photo application, group interface, and the like.

A playlists module 708 enables a viewing user to select playlists listened to and created by another user of the social networking system 130. In one embodiment, a user may selectively create a playlist on the social networking system 130 by simply inputting names of songs or selecting tracks on albums. Music may be broadcasted online in different streams from available external systems 120 corresponding to the inputted songs or selected tracks on albums, mixing the sources of music into a user-generated playlist graph object. In another embodiment, a user may import playlists from external systems 120 into the social networking system 130. In yet another embodiment, playlists are automatically imported to the social networking system 130 based on the user's listening behavior on the external system 120. In FIG. 7, the playlists module 708 displays three playlists: "Glee Cast Radio," "Chill out Mix," and "Journey's Greatest Hits." The radio playlist may be generated by an external system 120, such as an internet radio website that generates a playlist based on an artist or song. Terrestrial radio, including AM and FM radio, may make their playlists available to users of the social networking system 130 via a website, for example. The "Chill out Mix" playlist may be created by one of the users of the social networking system 130 and added to the playlists module 708 by the user associated with the music dashboard 700. In one embodiment, user-generated playlists, such as the "Chill out Mix" may be owned by more than one user, enabling users to modify playlists collaboratively via the social networking system 130. The "Journey's Greatest Hits" playlist may be generated by a third-party developer on an external system 120, such as Billboard or a record company promoting an artist. In one embodiment, a viewing user select a link 720 to suggest playlists to the user associated with the music dashboard 700. The suggested playlists may include playlists that the viewing user has generated or playlists generated by third-party developers using external systems. The playlists module 708 enables the social networking system 130 to record and understand the listening preferences of its users using rank scoring algorithms, heuristics analysis, and machine learning as described above. As a result, the user experience is enhanced while also providing valuable information about users for targeting advertisements, posting relevant content items, and the like.

A listen history module 710 may include the recent listens of the user associated with the music dashboard 700, "Bob" in this example, as well as the recent listens of Bob's friends on the social networking system 130. In another embodiment, music videos hosted on external systems 120 may be integrated into the listen history module 710. As illustrated in FIG. 7, selectable links to song objects on external systems 120 are listed for the user and the user's connections on the social networking system 130. Additionally, the user's connections are also represented by selectable links that may take the viewing user to the music dashboard of the user's connections in one embodiment, or to the profile page of the user's connections in another embodiment. The graph content item ranking module 150 may be utilized to display recent listens by the user's connections that are more relevant to the viewing user based on the viewing user's preferences and the viewing user's adjacency to the user's connections, in one embodiment. In another embodiment, the most recent listens by the user and the user's connections are displayed in the listen history module 710.

A recommendations module 712 utilizes the graph content item ranking module 150 to generate recommendations for the viewing user based on preferences obtained from the user profile object associated with the viewing user. In this example, the recommendations module 712 provides three songs for display to the viewing user: "Lady Gaga—Born This Way," "Madonna—Vogue," and "Ke$ha—Blow." The songs displayed in the recommendations module 712 may not have been listened to by the user associated with the music dashboard 700. Instead, the songs displayed to the viewing user are selected by the graph content item ranking module 150 based on a number of factors, including the viewing user's past history in clicking on links for song objects and artist objects, the viewing user's preferences, or interests stated on the viewing user's profile page for the social networking system 130, and information associated with the song objects and artist objects. For example, the viewing user may have numerous connections on the social networking system 130 that have listened to the song "Lady Gaga—Born This Way." As a result, the graph content item ranking module 150 may assign a high rank score for that song object for the viewing user. As another example, the viewing user may have recently listened to many songs on an album containing "Madonna—Vogue" without listening to that song, so that song may be recommended because it may be inferred that the viewing user may want to listen to the complete album. In yet another example, the artist "Ke$ha" may not have been listened to by the viewing user, but "Ke$ha" may be very similar to other artists that the viewing user has listened to recently. Based on metadata about the artist object for "Ke$ha," such as "pop" and "dance" genre objects, the song "Ke$ha—Blow" may be recommended for the viewing user.

Additional External User Interactions for Publishing to a Social Graph

Other actions performed on external systems, including websites, mobile applications, enterprise systems, and cloud-based services, may be captured by utilizing structured objects and actions as described herein for publishing to a social graph. Users purchasing gifts on an ecommerce website may, in one embodiment, trigger actions on objects that may be shared with other users of the social networking system 100. Location events, or "check-ins" into places on a location-based application operating on a mobile device equipped with a global positioning system (GPS) may generate actions and objects, in one embodiment, in the social graph. Sporting event scores, uploaded in real-time via enterprise systems, may also generate newsfeed stories regarding structured actions and objects generated via API calls to the social networking system 100. These external user interactions may also be integrated into the social networking user experience.

For example, a mobile user reading a book on an API on her mobile device, connected to the social networking system 130, may passively share with other users on the social networking system 130 that she is reading "Memoirs of a Geisha." The book may be identified as a book type object, and its ISBN would be a property of the book object, in one embodiment. The book object for "Memoirs of a Geisha" and the author object for its author, "Arthur Golden," may be associated with the "read" action and other objects would be associated, according to the structure defined by either a third-party developer or administrator of the social networking system, in one embodiment. Alternatively, the book object may be identified as a book type object, a product type object, and/or an entertainment type object, in another embodiment.

As another example, a movie rental website lists multiple movies and maintains a separate web page for each movie, encouraging users to submit reviews of movies they've watched. Links for accessing web pages may be associated with different movies such that various frames are generated by different widgets 124 communicating URLs or web identifiers of different web pages associated with different movies to the social networking system 130. The frames may record more than one action, such as a user indicating an interest wanting to see a particular movie associated with an object in the social networking system 130, a user indicating that he has seen a particular movie associated with an object in the social networking system 130, and a user reviewing a particular movie associated with an object in the social networking system 130. Each of those actions—wanting to see a movie, having watched a movie, and reviewing a movie—may be associated with a separate graph action type stored and maintained in the social networking system 130. Similarly, objects, including the movies, actors, directors, producers, settings, categories, and the like, may be associated with graph object types stored in the social networking system 130.

As an additional example, a user may be looking for restaurants to host a birthday dinner event that is also on the social networking system 130. A restaurant reservation website displays open reservations at restaurants in cities across the world. Each open reservation displayed on the website may include personalized content from the social networking system 130 indicating a user's friends recommendations and reviews of the restaurants, for example. If the user reserves a restaurant using the restaurant reservation website, an action for hosting a birthday party at the restaurant may be passively generated, assuming that the reservation website is connected to the social networking system 130 and has received permissions to share information with the social networking system 130. A query for a user's events may be made by the reservation website's developer in an API call that retrieves the user's events created on the social networking system 130, in one embodiment. Using this approach, the restaurant reservation website may filter the retrieved events based on date and geographic location, for example. A more sophisticated user-specified query may be made to search for the reservation date requested on the reservation website amongst the dates of events that are associated with a user's user profile object on the social networking system 130. Assuming that appropriate permissions have been authorized, the reservation website may record an action type of "hosting" an object type of "birthday party" that is also associated with the event object already created on the social networking system 130. In this way, graph actions and graph objects generated by third-party developers may be combined seamlessly with actions and objects that are native to the social networking system 130.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   storing at a social networking system a social graph, the social graph comprising a plurality of graph objects and a plurality of graph actions, each graph action having an action type and indicating a relationship between two or more graph objects;
   providing a user interface for defining action types or object types for capturing user interactions;

receiving an input comprising one or more action type configurations from a third-party developer external to the social networking system via the user interface;

responsive to the input, generating a definition of a new action type based on the one or more action type configurations, the definition comprising one or more object types of graph objects for which interactions of the new action type are valid;

receiving, at the social networking system, an indication that each of a plurality of users of the social networking system have performed graph actions of the new action type in connection with one or more graph objects, the plurality of users different from the third party developer; and responsive to receiving the indication, recording the graph actions in association with the one or more graph objects in the social graph.

2. The method of claim 1, wherein receiving an input comprising one or more action type configurations from a third-party developer external to the social networking system via the user interface further comprises:

receiving at least one object type that may be performed on by the new action type; and storing an association with the at least one object type as an action type configuration for the new action type.

3. The method of claim 1, further comprising:

responsive to the input of one or more action type configurations, rendering action type examples illustrating the action type configurations.

4. The method of claim 1, wherein providing a user interface for defining action types and object types for capturing user interactions further comprises:

rendering a drop down menu for selecting the configurations of action types or object types.

5. The method of claim 1, wherein providing a user interface for defining action types and object types for capturing user interactions further comprises:

rendering a text input field for defining properties of action types or object types.

6. The method of claim 1, further comprising:

responsive to user input, rendering a text input field for defining new properties of action types or object types; and rendering examples illustrating the new properties of the action types and the object types.

7. The method of claim 1, further comprising:

receiving a selection of one or more object type configurations from the entity external to the social networking system via the user interface; and responsive to the selection of the object type configurations, generating a definition of the new object type, the definition comprising the object type configurations for use by the social networking system to capture user interactions in association with graph actions having the new action type.

8. The method of claim 7, wherein receiving a selection of object type configurations from the entity external to the social networking system utilizing the user interface for defining a new object type further comprises:

receiving a selection of a different object type as a property of the new object type; and storing the different object type as an object type configuration for the new object type.

9. The method of claim 8, further comprising:

associating the different object type with the new action type.

10. The method of claim 7, further comprising:

responsive to the selection of the object type configurations, rendering object type examples illustrating the object type configurations.

11. The method of claim 1, further comprising:

providing a user interface for defining profile units for display on the social networking system, the profile units including textual descriptions about a graph action and a user who performed the graph action;

receiving a selection of one or more profile unit configurations from the entity external to the social networking system via the user interface for defining a new profile unit; and responsive to the selection of the profile unit configurations, generating a definition of the new profile unit, the definition comprising the profile unit configurations for use by the social networking system to display graph objects in association with graph actions having the new action type.

12. The method of claim 11, wherein receiving a selection of one or more profile unit configurations from the entity external to the social networking system via the user interface for defining a new profile unit further comprises:

receiving a selection of a template for visualizing graph actions having the new action type;

receiving a grouping parameter for grouping graph objects associated with graph actions having the new action type;

receiving a sorting parameter for sorting graph actions having the new action type; and storing the selection of the template, the grouping parameter, and the sorting parameter as profile unit configurations for the new action type.

13. The method of claim 11, wherein receiving a selection of one or more profile unit configurations from the entity external to the social networking system utilizing the user interface for defining a new profile unit further comprises:

receiving a grouping property of the new profile unit, the grouping property used by the new profile unit to group graph actions and graph objects associated with the new profile unit according to the grouping property; and responsive to a query on graph actions having the new action type, grouping results of the query according to the grouping property of the new profile unit.

14. The method of claim 11, wherein receiving a selection of profile unit configurations from the entity external to the social networking system utilizing the user interface for defining a new profile unit further comprises:

receiving a sorting property of the new profile unit, the sorting property used by the new profile unit to sort graph actions and graph objects associated with the new profile unit according to the sorting property; and responsive to a query on graph actions having the new action type, sorting results of the query according to the sorting property of the new profile unit.

15. The method of claim 11, further comprising:

responsive to the selection of profile unit configurations, rendering profile unit examples illustrating the profile unit configurations.

16. The method of claim 11, wherein profile units further comprise a textual descriptions about a graph object associated with the graph action and the user who performed the graph action.

17. A method comprising:

providing a user interface for defining action types or object types for capturing user interactions;

receiving an input comprising one or more action type configurations from a third-party developer external to a social networking system via the user interface;

responsive to the input, generating a definition of a new action type based on the one or more action type configurations, the definition comprising one or more object types of graph objects for which interactions of the new action type are valid;

receiving, at the social networking system, an indication that each of a plurality of users of the social networking system have performed graph actions of the new action type in connection with one or more graph objects, the plurality of users different from the third party developer; and responsive to receiving the indication, recording the graph actions in association with the one or more graph objects in a social graph, the social graph comprising a plurality of graph objects and a plurality of graph actions, each graph action having an action type and indicating a relationship between two or more graph objects.

18. A non-transitory computer-readable storage medium storing executable computer program instructions, the instructions executable to perform steps comprising storing at a social networking system a social graph, the social graph comprising a plurality of graph objects and a plurality of graph actions, each graph action having an action type and indicating a relationship between two or more graph objects;

providing a user interface for defining action types or object types for capturing user interactions;

receiving an input comprising one or more action type configurations from a third-party developer external to the social networking system via the user interface;

responsive to the input, generating a definition of a new action type based on the one or more action type configurations, the definition comprising one or more object types of graph objects for which interactions of the new action type are valid;

receiving, at the social networking system, an indication that each of a plurality of users of the social networking system have performed graph actions of the new action type in connection with one or more graph objects, the plurality of users different from the third party developer; and responsive to receiving the indication, recording the graph actions in association with the one or more graph objects in the social graph.

19. A system comprising:

a processor; and a non-transitory computer-readable storage medium coupled to the processor, the computer-readable storage medium including instructions that, when executed by a processor, cause the processor to:

storing at a social networking system a social graph, the social graph comprising a plurality of graph objects and a plurality of graph actions, each graph action having an action type and indicating a relationship between two or more graph objects, providing a user interface for defining action types or object types for capturing user interactions, receiving an input comprising one or more action type configurations from a third-party developer external to the social networking system via the user interface, responsive to the input, generating a definition of a new action type based on the one or more action type configurations, the definition comprising one or more object types of graph objects for which interactions of the new action type are valid, receiving, at the social networking system, an indication that each of a plurality of users of the social networking system have performed graph actions of the new action type in connection with one or more graph objects, the plurality of users different from the third party developer, and responsive to receiving the indication, recording the graph actions in association with the one or more graph objects in the social graph.

20. A non-transitory computer-readable storage medium storing executable computer program instructions, the instructions executable to perform steps comprising providing a user interface for defining action types or object types for capturing user interactions;

receiving an input comprising one or more action type configurations from a third-party developer external to a social networking system via the user interface;

responsive to the input, generating a definition of a new action type based on the one or more action type configurations, the definition comprising one or more object types of graph objects for which interactions of the new action type are valid;

receiving, at the social networking system, an indication that each of a plurality of users of the social networking system have performed graph actions of the new action type in connection with one or more graph objects, the plurality of users different from the third party developer; and responsive to receiving the indication, recording the graph actions in association with the one or more graph objects in a social graph, the social graph comprising a plurality of graph objects and a plurality of graph actions, each graph action having an action type and indicating a relationship between two or more graph objects.

21. A system comprising:

a processor; and a non-transitory computer-readable storage medium coupled to the processor, the computer-readable storage medium including instructions that, when executed by a processor, cause the processor to:

providing a user interface for defining action types or object types for capturing user interactions, receiving an input comprising one or more action type configurations from a third-party developer external to a social networking system via the user interface, responsive to the input, generating a definition of a new action type based on the one or more action type configurations, the definition comprising one or more object types of graph objects for which interactions of the new action type are valid, receiving, at the social networking system, an indication that each of a plurality of users of the social networking system have performed graph actions of the new action type in connection with one or more graph objects, the plurality of users different from the third party developer, and responsive to receiving the indication, recording the graph actions in association with the one or more graph objects in a social graph, the social graph comprising a plurality of graph objects and a plurality of graph actions, each graph action having an action type and indicating a relationship between two or more graph objects.

* * * * *

UNITED STATES PATENT AND TRADEMARK OFFICE
CERTIFICATE OF CORRECTION

| | |
|---|---|
| PATENT NO. | : 9,032,290 B2 |
| APPLICATION NO. | : 13/239345 |
| DATED | : May 12, 2015 |
| INVENTOR(S) | : Brynn Sheperd et al. |

It is certified that error appears in the above-identified patent and that said Letters Patent is hereby corrected as shown below:

Claims

Column 53, line 23, Claim 17, after "comprising," insert --:--.

Column 54, line 14, Claim 20, after "comprising," insert --:--.

Signed and Sealed this
Twenty-third Day of February, 2016

Michelle K. Lee
*Director of the United States Patent and Trademark Office*